(12) United States Patent
Masuichi et al.

(10) Patent No.: US 7,401,016 B2
(45) Date of Patent: Jul. 15, 2008

(54) COMMUNICATION SUPPORT SYSTEM, COMMUNICATION SUPPORT METHOD, AND COMPUTER PROGRAM

(75) Inventors: Hiroshi Masuichi, Kanagawa (JP); Hiroyuki Hattori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 944 days.

(21) Appl. No.: 10/396,322

(22) Filed: Mar. 26, 2003

(65) Prior Publication Data
US 2004/0078193 A1   Apr. 22, 2004

(30) Foreign Application Priority Data
Oct. 18, 2002 (JP) ............................. 2002-304583

(51) Int. Cl.
*G06F 17/28* (2006.01)
*G06F 17/27* (2006.01)
*G06F 17/21* (2006.01)
*G10L 15/00* (2006.01)

(52) U.S. Cl. ............... 704/10; 704/7; 704/9; 704/235
(58) Field of Classification Search ............... 704/235, 704/9, 10; 340/7.56
See application file for complete search history.

(56) References Cited

U.S. PATENT DOCUMENTS

| | | | | | |
|---|---|---|---|---|---|
| 4,864,503 A | * | 9/1989 | Tolin | ............................. | 704/2 |
| 5,101,349 A | * | 3/1992 | Tokuume et al. | ............... | 704/9 |
| 5,600,765 A | * | 2/1997 | Ando et al. | ................. | 345/668 |
| 5,684,999 A | * | 11/1997 | Okamoto | ........................ | 704/9 |
| 6,493,663 B1 | | 12/2002 | Ueda | | |

FOREIGN PATENT DOCUMENTS

| | | |
|---|---|---|
| JP | A 10-069484 | 3/1998 |
| JP | A 11-85758 | 3/1999 |
| JP | A 11-120177 | 4/1999 |
| JP | A 2000-235584 | 8/2000 |

OTHER PUBLICATIONS

Mary Dalrymple et al., "Formal Issues in Lexical-Functional Grammar," *CSLI Publications*, Stanford University, pp. 29-130 (1995).
Anette Frank, "From Parallel Grammar Development towards Machine Translation," *In Proceedings of MT Summit VII*, "MT in the Great Translation Era," Singapore, pp. 134-142 (1999).

(Continued)

*Primary Examiner*—David Hudspeth
*Assistant Examiner*—Justin W. Rider
(74) *Attorney, Agent, or Firm*—Oliff & Berridge, PLC

(57) ABSTRACT

In the invention, words in f-structure are represented as illustrations that can be understood by any persons regardless of what languages they use, whereby it is made possible to make the f-structure completely language-independent representation. Accordingly, two translation systems of a translation system from one language L into f-structure using illustration representation and a translation system from f-structure using illustration representation into language L are simply constructed, whereby communication support among persons using every language can be provided.

10 Claims, 24 Drawing Sheets

OTHER PUBLICATIONS

Mary Dalrymple, "Syntax and Semantics: Lexical Functional Grammar," *Academic Press*, vol. 34, pp. 1-44 (2001).

Ronald M. Kaplan et al., "LFG Generation Produces Context-free Languages," *In Proceedings of the 18th Int'l Conference on Computational Linguistics*, Saarbrucken, pp. 425-431 (2000).

Mary Dalrymple et al., "Formal Issues in Lexical-Functional Grammar," *CSLI Publications*, Stanford University, pp. 29-130 (1995).

Anette Frank, "From Parallel Grammar Development towards Machine Translation," *In Proceedings of MT Summit VII, "MT in the Great Translation Era*," Singapore, pp. 134-142 (1999).

Mary Dalrymple, "Syntax and Semantics: Lexical Functional Grammar," *Academic Press*, vol. 34, pp. 1-44 (2001).

Ronald M. Kaplan et al., "LFG Generation Produces Context-free Languages," *In Proceedings of the 18th Int'l Conference on Computational Linguistics*, Saarbrucken, pp. 425-431 (2000).

Hozumi Tanaka, "Natural Language Processing and Its Application," *The Institute of Electronics, Information and Communication Engineers*, pp. 248-255 (1999).

"Visual Requirements Definition based on a Communication Model," Kindai kagaku sha Co., Ltd., Lecture Note/Softwares Studies 17, Basics of Software Engineering III, p. 58-p. 65 (Dec. 20, 1996).

* cited by examiner

FIG. 13

| ATTRIBUTE OR VALUE | EXPLANATION |
|---|---|
| SUBJ | SUBJECT (WHICH CAUSES MOTION) |
| OBJ | OBJECT (MOTION OR CHANGE OBJECT) |
| SOURCE | START POINT (START POINT OF MOVE OF OBJECT OR INITIAL STATE OF CHANGE OF OBJECT) |
| GOAL | GOAL (END POINT OF MOVE OF OBJECT OR FINAL STATE OF CHANGE OF OBJECT) |
| LOC | LOCATION (WHERE EVENT OCCURS) |
| TIME | TIME (WHEN EVENT OCCURS) |
| INSTR | INSTRUMENT · FACTOR (WHAT CAUSES EVENT TO OCCUR) |
| Pres | PRESENT |
| past | PAST |
| future | FUTURE |
| progress | PROGRESSIVE FORM |
| perfect | PERFECT FORM |
| wish | WISH |
| presumption | PRESUMPTION |
| decl | AFFIRMATIVE SENTENCE |
| int | INTERPROGATIVE SENTENCE |
| cond | SUBJECTIVE SENTENCE |
| ADJUNCT | GENERAL ADJUNCT COMPONENT |

DISPLAY SCREEN

SUBJECT    OBJECT

FIG. 16

| ATTRIBUTE OR VALUE | EXPLANATION | ATTRIBUTE PAIRED WITH VALUE IF VALUE IS APPLIED |
|---|---|---|
| SUBJ | SUBJECT (WHICH CAUSES MOTION) | |
| OBJ | OBJECT (MOTION OR CHANGE OBJECT) | |
| SOURCE | START POINT (START POINT OF MOVE OF OBJECT OR INITIAL STATE OF CHANGE OF OBJECT) | |
| GOAL | GOAL (END POINT OF MOVE OF OBJECT OR FINAL STATE OF CHANGE OF OBJECT) | |
| LOC | LOCATION (WHERE EVENT OCCURS) | |
| TIME | TIME (WHEN EVENT OCCURS) | |
| INSTR | INSTRUMENT · FACTOR (WHAT CAUSES EVENT TO OCCUR) | |
| Pres | PRESENT | TENSE |
| past | PAST | TENSE |
| future | FUTURE | TENSE |
| progress | PROGRESSIVE FORM | ASPECT |
| perfect | PERFECT FORM | ASPECT |
| wish | WISH | ADDRESS |
| presumption | PRESUMPTION | ADDRESS |
| decl | AFFIRMATIVE SENTENCE | SENTENCE-TYPE |
| int | INTERPROGATIVE SENTENCE | SENTENCE-TYPE |
| cond | SUBJECTIVE SENTENCE | SENTENCE-TYPE |
| ADJUNCT | GENERAL ADJUNCT COMPONENT | |

FIG. 18

| VERB ILLUSTRATION ID | CASE RELATION | 1ST PRIORITY ILLUSTRATION ID | 2ND PRIORITY ILLUSTRATION ID | 3RD PRIORITY ILLUSTRATION ID | ... |
|---|---|---|---|---|---|
| ID 1 | SUBJ | ID 18 | ID 19 | ID 7 | ... |
|  | OBJ | ... | ... | ... | ... |
|  | INSTR | ... | ... | ... | ... |
| ID 2 | SUBJ | ID 18 | ID 19 | ID 7 | ... |
|  | SOURCE | ... | ... | ... | ... |
|  | GOAL | ... | ... | ... | ... |
| ID 3 | SUBJ | ID 18 | ID 19 | ID 7 | ... |
|  | OBJ | ID 13 | ID 17 | ID 10 | ... |
| ID 4 | ... | ... | ... | ... | ... |
|  | ... | ... | ... | ... | ... |

COMMUNICATION SUPPORT SYSTEM, COMMUNICATION SUPPORT METHOD, AND COMPUTER PROGRAM

The present disclosure relates to the subject matter contained in Japanese Patent Application No. 2002-366469 filed on Dec. 18, 2002, which is incorporated herein by reference in its entirety.

BACKGROUND OF THE INVENTION

1. Field of the Invention

The present invention relates to a communication support system, a communication support method, and a computer program for supporting communication among a large number of different languages and in particular to a communication support system, a communication support method, and a computer program for supporting communication among a large number of different languages using an interlingua system for first converting a source language into an intermediate language independent of a specific language and then converting the intermediate language into a target language.

More particularly, the present invention relates to a communication support system, a communication support method, and a computer program that can be used regardless of what the language is and can be constructed with a small number of steps and in particular to a communication support system, a communication support method, and a computer program for supporting communication among a large number of different languages by representing an intermediate language in a more understandable form.

2. Description of the Related Art

A language used by a human being for daily communicating with another person, such as Japanese or English, is called "natural language." Natural language has an almost spontaneous origin and evolves with the history of human beings, the history of races, and the history of society; various natural languages exist at present. Of course, one person can communicate with another person by gesture, but the natural language enables most natural and advanced communication between the persons.

Natural language originally has an abstract and a highly ambiguous nature, but can be processed in a computer by handling the text mathematically. Consequently, various application services concerning the natural languages by automation processing, such as machine translation, an interactive system, and a search system, can be realized.

Among them, "machine translation" is a system for supporting communication between persons using different languages by making the most of computer processing.

The commercially practical machine translation systems at present are based on a system called direct machine translation system (henceforth "direct system") or transfer-based machine translation system (henceforth "transfer system").

Basically, the direct system simply replaces words of a source language with words of a target language. This is an effective system only when the grammar of the source language is similar to that of the target language as with Japanese-Korean translation.

On the other hand, the transfer system includes processing of replacing syntactic structures as well as replacing words. By way of example, the case where English sentence (1) is translated into Japanese sentence (2) in an English-Japanese translation system is considered.

(1) It is important to study English every day.

(2) Eigowo mainichi benkyousurunoha jyuuyouda.
 (*Japanese Sentence)

The syntactic structure in (1) is largely different from the syntactic structure in (2). Thus, the transfer system performs the steps of first converting (1) into an English sentence (3), which can be easily translated into Japanese, and then converting the English sentence (3) into Japanese.

(3) To study English every day is important.

That is, the transfer system requires a conversion rule of converting a source language sentence into "a source language sentence easily translated into a target language sentence" (within the same language) and also requires a conversion rule of converting the syntactic structure of source language sentence into the syntactic structure of target language sentence. For both conversion rules, if either of the target language and the source language differs, entirely different conversion rules are required. Of course, like the direct system, the transfer system requires a word dictionary to convert words of a source language into words of a target language.

As a third machine translation system, a technique called interlingua-based machine translation system (henceforth "interlingua system") has been proposed. In the interlingua system, a source language is converted into an intermediate (interlingua) language independent of a specific language and then the intermediate language is converted into a target language. As an example of the intermediate language, there is a structure called f(unctional)-structure obtained as a result of syntactic analysis based on a grammar theory called Lexical Functional Grammar (LFG).

In LFG, the language knowledge of a native speaker, namely grammar, is formed as a component separated from other non-grammatical processing parameters affecting computer processing and computer processing operation. Details of LFG are described, for example, in paper "Lexical-Functional Grammar: A Formal System for Grammatical Representation" in collaboration with R. M. Kaplan and J. Bresnan (The MIT Press, Cambridge (1982). Reprinted in Formal Issues in Lexical-Functional Grammar, pp. 29-130. CSLI publications, Stanford University (1995).) The f-structure represents grammatical functions clearly and is made up of grammatical function names, semantics formats, and feature symbols. The f-structure is referenced, whereby semantic understanding of subject, object, complement, and adjunct can be obtained.

A machine translation system using the f-structure as an intermediate language is described in detail in document "Frank, A., "From Parallel Grammar Development towards Machine Translation." In Proceedings of MT Summit VII, "MT in the Great Translation Era," Singapore, pp. 134-142. (1999)." As a document giving a general description of the three systems, "Hozumi TANAKA, "Natural Language Processing and Its Application" The Institute of Electronics, Information and Communication Engineers (1999)" can be named.

Supporting communication among a large number of different languages by a machine translation system is considered hereinafter.

The direct system requires that a word dictionary to convert words of a source language into words of a target language be provided for each of combinations of source languages and target languages. Likewise, the transfer system also requires that a syntax dictionary (a conversion rule set to convert syntax of source language sentence S into syntax of source language sentence S', which is easily converted into a target language sentence, and a conversion rule set to convert S' into syntax of a target language sentence S"be provided for each of combinations of source languages and target languages in addition to the word dictionary.

Thus, to support communication among n different languages, $n^2-n$ dictionaries (machine translation systems) must be constructed. For example, to support communication among 10 different languages, 90 ($=_{10}P_2$) systems need to be constructed (see FIG. 2).

However, simply constructing a single word/syntax dictionary (translation system) requires an enormous number of steps. Therefore, it is an extremely difficult job to construct dictionaries or translation systems to deal with all language combinations.

If such a dictionary construction job is applied between languages each having a large language population such as English, Chinese, German, French, and Japanese, the difficulty is relatively because there is a rich language resource of word dictionaries for translation and the like. However, when either or both of a source language and a target language are languages each having a small language population, the scholar resources involved in language processing are inevitably poor and thus it is practically impossible to construct a word dictionary or a syntax dictionary to implement a translation system. Therefore, if the transfer system or the direct system is adopted, it is extremely difficult to construct a support system for a person using a language having a small language population to communication with a person using any other language.

Even if the interlingua system is adopted, the conversion system between the intermediate language and each language depends on the language and therefore if it is necessary to support communication among n different languages, 2n entirely different conversion systems (machine translation systems) need to be constructed. For example, to support communication among 10 different languages, 20 translation systems need to be constructed (see FIG. 3). It is also practically impossible to construct such a system for a language having a small language population as with the transfer system and the direct system.

SUMMARY OF THE INVENTION

It is therefore an object of the invention to provide an excellent communication support system, an excellent communication support method, and an excellent computer program capable of suitably supporting communication among a large number of different languages.

According to a first aspect of the invention, there is provided a communication support system for supporting communication between users using natural languages. The system includes a semantic analysis section, an illustration dictionary retention section, and an illustration representation presentation section. The semantic analysis section performs semantic analysis processing for a natural language sentence received from a first user to extract word information, case information, and attribute information of the sentence. The illustration dictionary retention section retains the word information, the case information, and the attribute information and illustrations corresponding thereto. The illustration representation presentation section references the illustration dictionary retention section to present the word information, the case information, and the attribute information, which are extracted by the semantic analysis section, for a second user as illustration representation.

According to a second aspect of the invention, there is provided a communication support system for supporting communication between users using natural languages. The system includes an illustration dictionary retention section, an illustration representation generation section, and a sentence generation section. The illustration dictionary retention section retains word information, case information, and attribute information and illustrations corresponding thereto. The illustration representation generation section supports a first user selecting illustrations corresponding to the word information, the case information, and the attribute information from the illustration dictionary retention section and represents a sentence as the illustrations. The sentence generation section references the illustration dictionary retention section to generate a natural language sentence from the illustration representation provided by the illustration representation generation section and presents the natural language sentence for a second user.

According to a third aspect of the invention, there is provided a communication support system for supporting communication between users using natural languages. The system includes an illustration dictionary retention section and an illustration representation generation section. The illustration dictionary retention section retains word information, case information, and attribute information and illustrations corresponding thereto. The illustration representation generation section references the illustration dictionary retention section to support representing a sentence as illustrations and to present the obtained illustration representation.

According to a fourth aspect of the invention, there is provided a computer program described in a computer-readable format to execute processing for supporting communication between users using natural languages in a computer system. The processing includes performing semantic analysis processing for a natural language sentence received from a first user to extract word information, case information, and attribute information of the sentence, and referencing an illustration dictionary retaining the word information, the case information, and the attribute information and illustrations corresponding thereto to present the word information, the case information, and the attribute information, which are executed in the semantic analysis processing step, for a second user as illustration representation.

According to a fifth aspect of the invention, there is provided a computer program described in a computer-readable format so as to execute processing for supporting communication between users using natural languages in a computer system. The processing includes supporting a first user selecting illustrations corresponding to word information, case information, and attribute information from an illustration dictionary retaining the word information, the case information, and the attribute information and illustrations corresponding thereto, to represent a sentence as the illustrations, referencing the illustration dictionary to generate a natural language sentence from the illustration representation provided in the illustration representation generation step, and presenting the natural language sentence for a second user.

According to a sixth aspect of the invention, there is provided a computer program described in a computer-readable format so as to execute processing for supporting communication between users using natural languages in a computer system. The processing includes referencing an illustration dictionary retaining word information, case information, and attribute information and illustrations corresponding thereto, supporting representing a sentence as illustrations, and presenting the obtained illustration representation.

The computer program according to each of the fourth to sixth aspects of the invention is described in the computer-readable format so as to execute predetermined processing in a computer system. In other words, the computer programs according to the fourth to sixth aspects of the invention are installed in the computer system, whereby the computer programs work in cooperation with each other and can provide similar functions and advantages to those of the communication support systems according to the first to third aspects of the invention.

The above and other objects, features and advantages of the invention will be apparent from the following detailed description of the preferred embodiments of the invention in conjunction with the accompanying drawings.

BRIEF DESCRIPTION OF THE DRAWINGS

In the accompanying drawings:

FIG. 13 is a drawing to show an example of an attribute dictionary in the first embodiment of the invention;

FIG. 16 is a drawing to show an example of an attribute dictionary in the second embodiment of the invention;

FIG. 18 is a drawing to show an example of an illustration case relation dictionary;

DETAILED DESCRIPTION OF THE PREFERRED EMBODIMENTS

Referring now to the accompanying drawings, there are shown preferred embodiments of the invention.

A communication support system according to an embodiment of the invention may utilize, for example, a semantic analysis system based on LFG. LFG outputs a language-independent structure called f-structure, as described in the background of the invention. That is, although languages differ, if sentences have the same meaning, f-structure having the same structure is output.

For the parallelism across languages of the f-structure, refer to paper "Syntax and Semantics: Lexical Functional Grammar" (Academic Press (2001)) written by Dalrymple, M., for example. Of course, in addition to LFG, for example, case grammar proposed by C. J. Fillmore can be named as an example of a grammar theory capable of providing the analysis result having parallelism across languages. However, in any case, the analysis result structure has parallelism across languages and the word information contained in the structure varies from one language to another as a matter of course.

In the f-structure output by LFG, all of word information of a sentence, case information indicating a semantic structure, and attribute information of tense, aspect, etc., are represented by a nest structure of "attribute-value" pairs. That is, a sentence is represented by a set of "attribute-value pairs" and values can be a set of "attribute-value pairs". The words making up the sentence are described in the f-structure as the values corresponding to an attribute called PRED (predicate). In the f-structure, the portions changing depending on the language are only the values (words) corresponding to the attribute PRED, and other attributes and values are made common (are standardized) throughout all languages.

Figure 1:
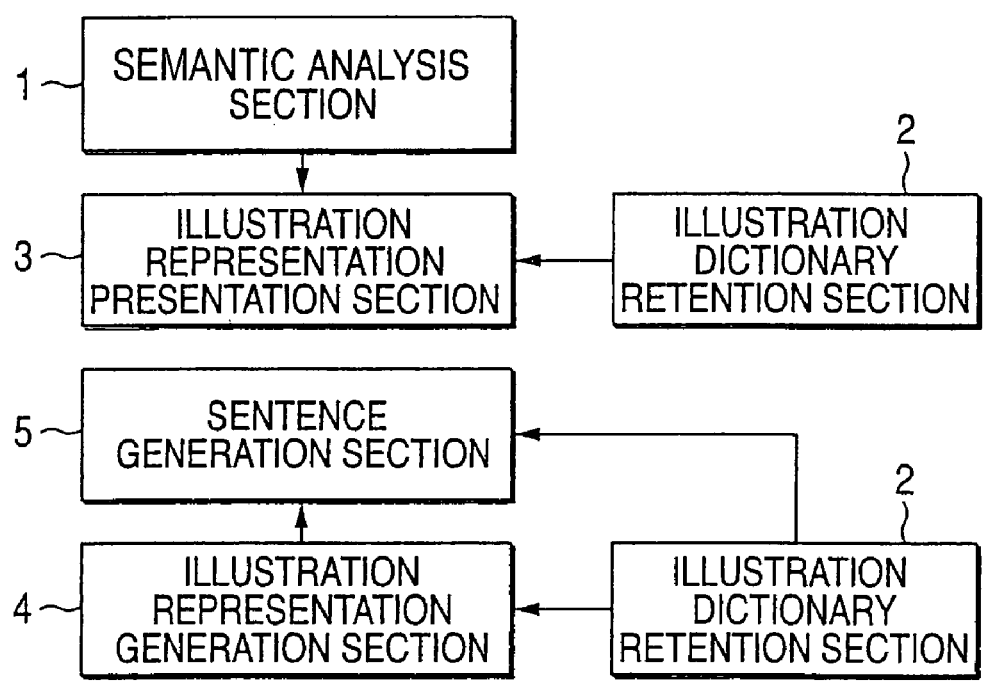
FIG. 1 is a block diagram to show the configuration of a typical communication support system according to the invention.
Figure 2:
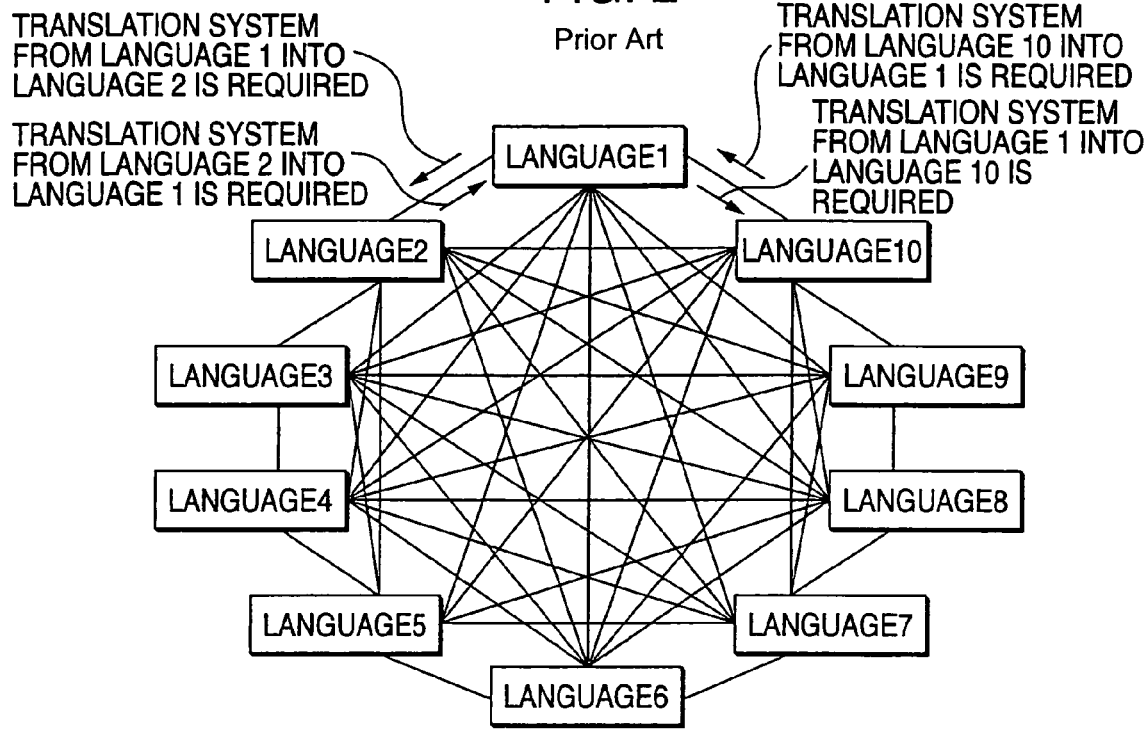
FIG. 2 is a drawing to show a multilanguage communication support system according to a transfer system.
Figure 3:
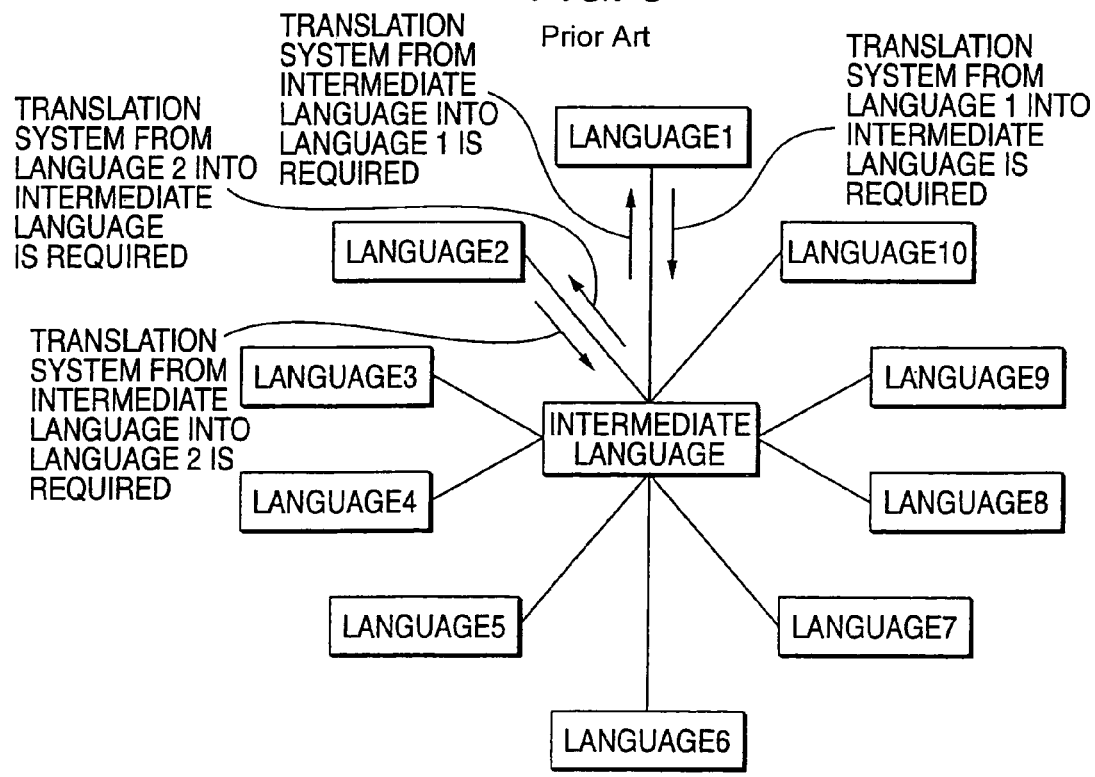
FIG. 3 is a drawing to show the configuration of a multilanguage communication support system according to an interlingua system (related art example)
Figure 4:
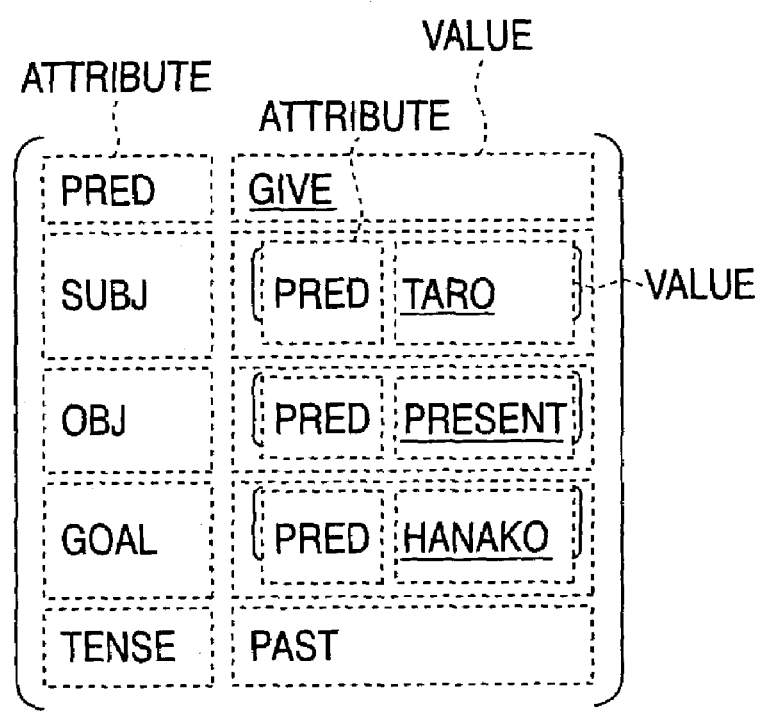
FIG. 4 is a drawing to show an example of f-structure.

FIG. 4 shows an example of the f-structure provided as a result of analyzing the following example sentence (4) based on LFG. The attribute and its corresponding value are represented as they are arranged at horizontal positions in the figure. The underscored portions in the figure are word information (values corresponding to the PRED attribute), and all other portions are common concept to all languages (although they are represented in English in writing).

(4) Taro Gave a Present to Hanako.

The communication support system according to the embodiment of the invention represents words in the f-structure as illustrations. Words are represented as illustrations, which any persons can understand regardless of what languages they use, whereby it is made possible to make the f-structure completely language-independent representation.

Figure 5:
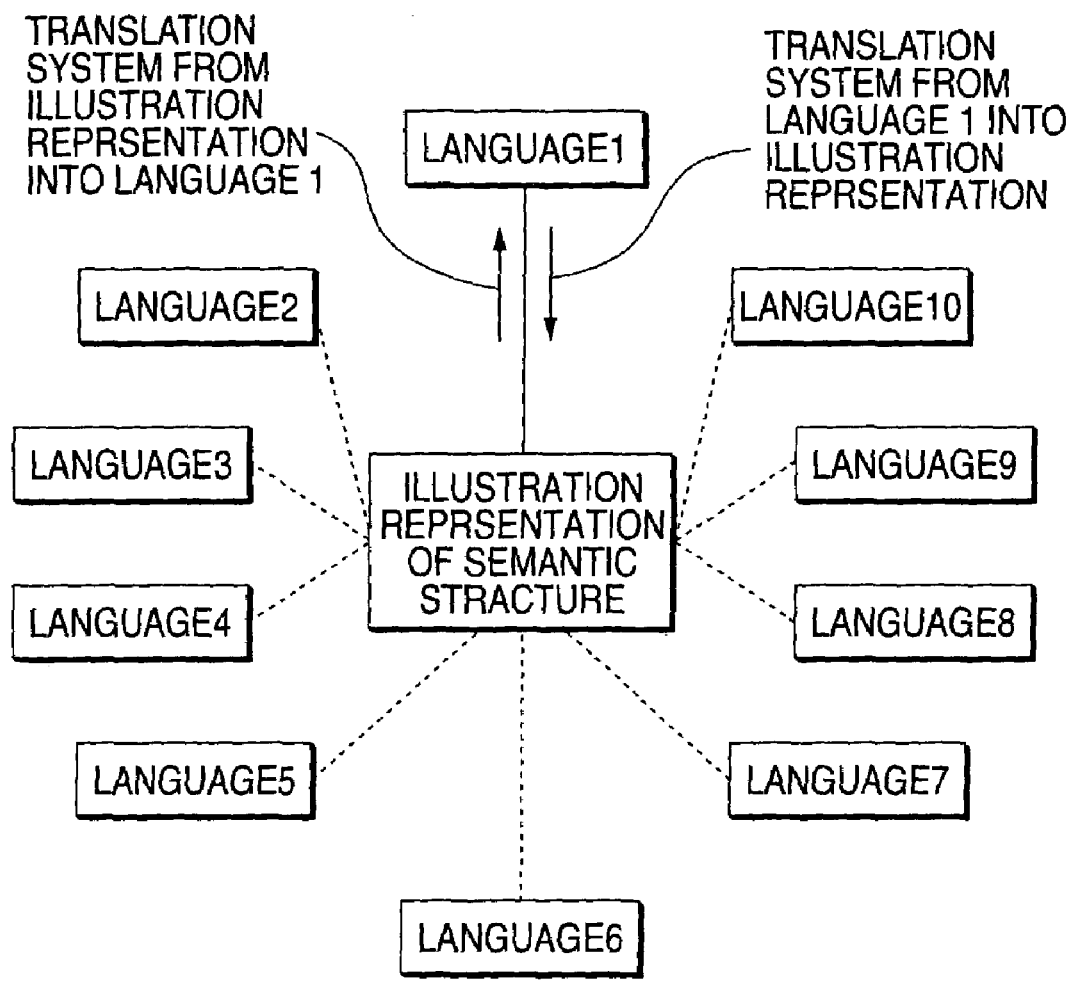
FIG. 5 is a drawing to show the mechanism of a multilanguage communication support system according to the invention.

Accordingly, two translation systems of a translation system from one language L into f-structure using illustration representation and a translation system from f-structure using illustration representation into language L may be easily realized, providing communication support among persons using every language. FIG. 5 illustrates the mechanism of the communication support system according to the embodiment of the invention functioning as a two-way translation system from language L into f-structure using illustration representation and from f-structure using illustration representation into language L.

That is, the embodiment of the invention makes it possible to solve the problem involved in the existing transfer system and interlingua system requiring that a large number of translation systems be constructed. At the same time, representation, which any person using every language can understand, can be used, so that it is also possible to support communication with persons using a language having a small language population.

First Embodiment

Figure 6:
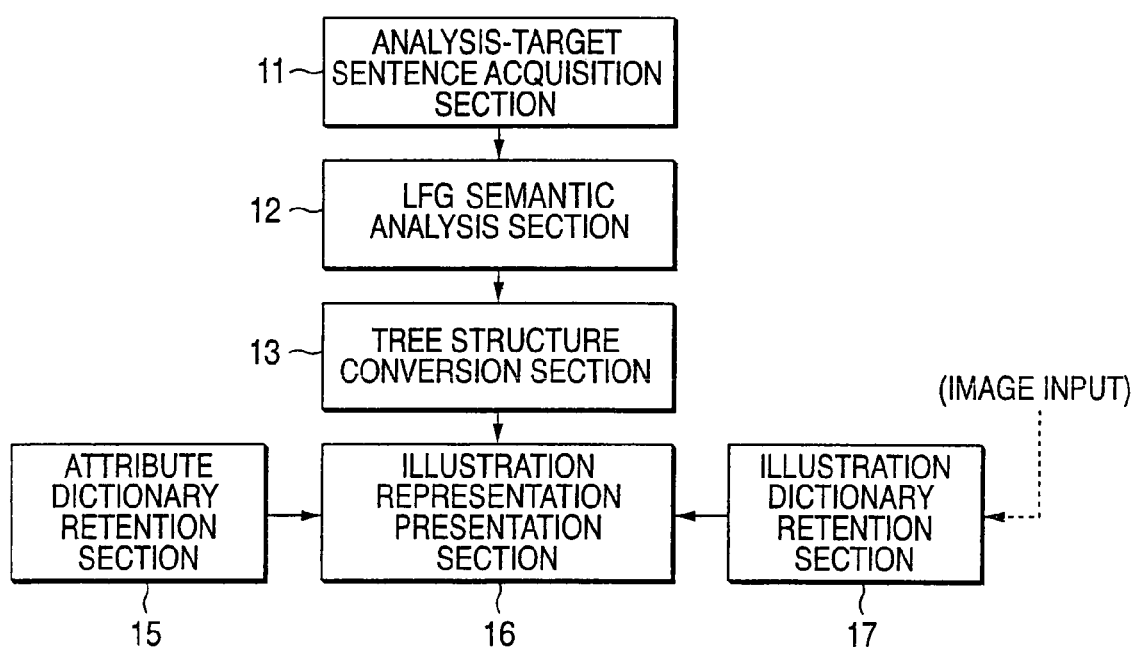
FIG. 6 is a block diagram to show the functional configuration of a multilanguage communication support system according to a first embodiment of the invention.

FIG. 6 schematically shows the configuration of a multilanguage communication support system according to a first embodiment of the invention.

In the embodiment shown in the figure, semantic analysis section based on LFG (Lexical Functional Grammar) is used. In LFG, the language knowledge of a native speaker, namely, grammar is formed as a component separated from other non-grammatical processing parameters affecting computer processing and computer processing operation. LFG outputs a language-independent structure called f-structure. That is, although languages differ, if sentences have the same meaning, f-structure having the same structure is output. However, it is understood by those skilled in the art that a semantic analysis unit capable of providing the analysis result having parallelism across languages would be able to provide a similar advantage even if it is based on any other than LFG.

An example of the system for converting a English sentence into illustration representation is shown below. It is to be understood that similar advantages can be provided if the language is any language other than English.

As shown in FIG. 6, the multilanguage communication support system according to the embodiment includes an analysis-target sentence acquisition section 11, an LFG semantic analysis section 12, a tree structure conversion section 13, an illustration dictionary retention section 14, an attribute dictionary retention section 15, and an illustration representation presentation section 16.

The analysis-target sentence acquisition section 11 has an interface for enabling a first user who can understand English to enter the contents to be conveyed to a second user who converses with the first user and cannot understand English as an English sentence.

LFG semantic analysis section 12 receives the English sentence entered through the analysis-target sentence acquisition section 11 and outputs f-structure as the semantic analysis result based on LFG. For details of the semantic analysis result based on LFG, refer to the above-mentioned paper "Semantics and Syntax in Lexical Functional Grammar" (Academic Press (2001)) written by Dalrymple, M., for example.

Figure 7:
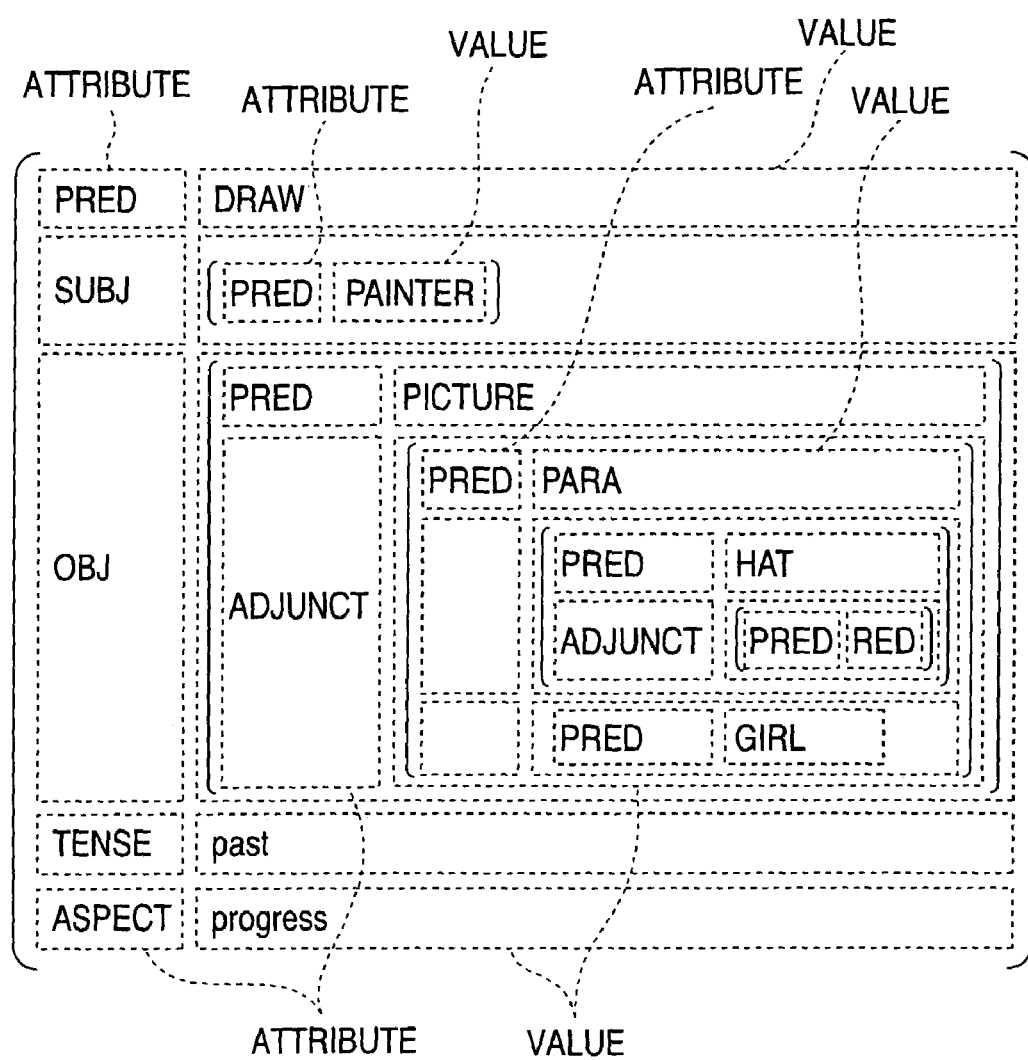
FIG. 7 is a drawing to show an example of f-structure.

FIG. 7 shows an example of f-structure corresponding to the following example sentence (5):

(5) A painter was drawing a picture of a red hat and a woman.

Upon reception of the f-structure from LFG semantic analysis section 12, the tree structure conversion section 13 converts the f-structure into a tree structure indicating a semantic structure. A procedure for conversion from f-structure to tree structure will be discussed in detail below:

[Step 1]
All values corresponding to PRED attribute in the f-structure are extracted and are adopted as nodes making up a tree structure.

Figure 8:
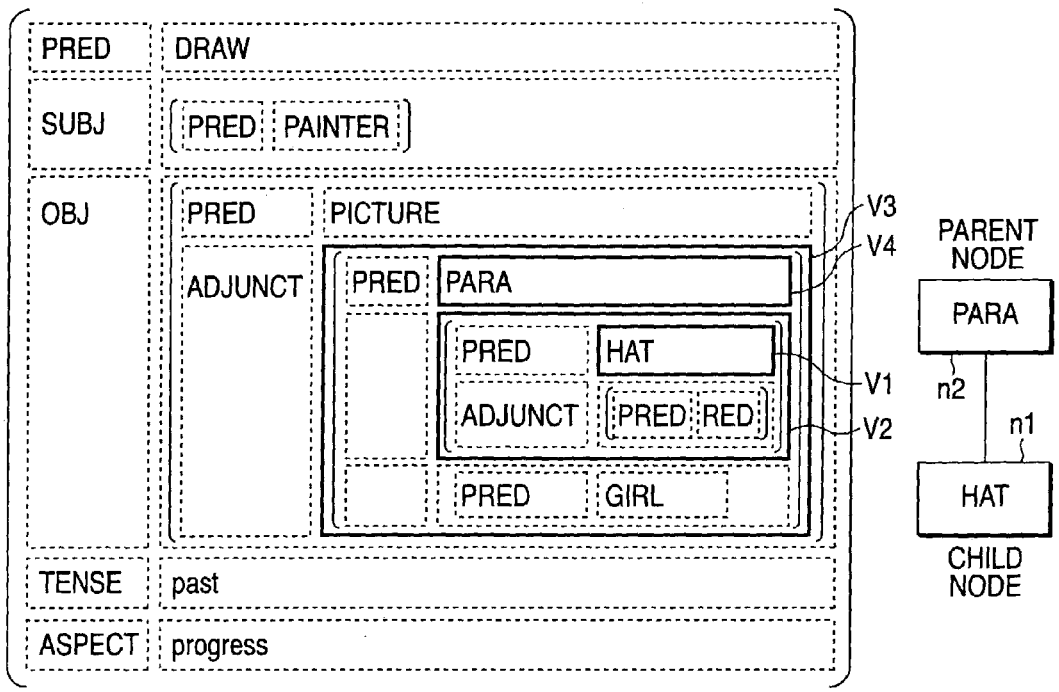
FIG. 8 is a drawing to describe conversion processing from f-structure to tree structure.

[Step 2]
The inclusion relationship of a nest structure of attribute-value pairs in the f-structure is assumed to be the parent-child relationship between nodes in the tree structure, and the nodes are connected to create the tree structure. That is, processing concerning n1 "wherein the value (of PRED) corresponding to one node n1 is assumed to be v1 and the innermost value including v1 is assumed to be v2 and the innermost value including v2 is assumed to be v3 and if the value corresponding to the PRED attribute, which v3 has, is assumed to be v4, the node corresponding to v4 is assumed to be parent node n2 of n1 (see FIG. 8)" is performed for all nodes obtained at [step 1]. It should be noted that the whole f-structure is assumed to be one value for performing the processing. The node corresponding to the value of the PRED attribute, which the value corresponding to the whole f-structure has, is assumed to be the node corresponding to the root of the tree structure because no parent node exists.

Figure 9:
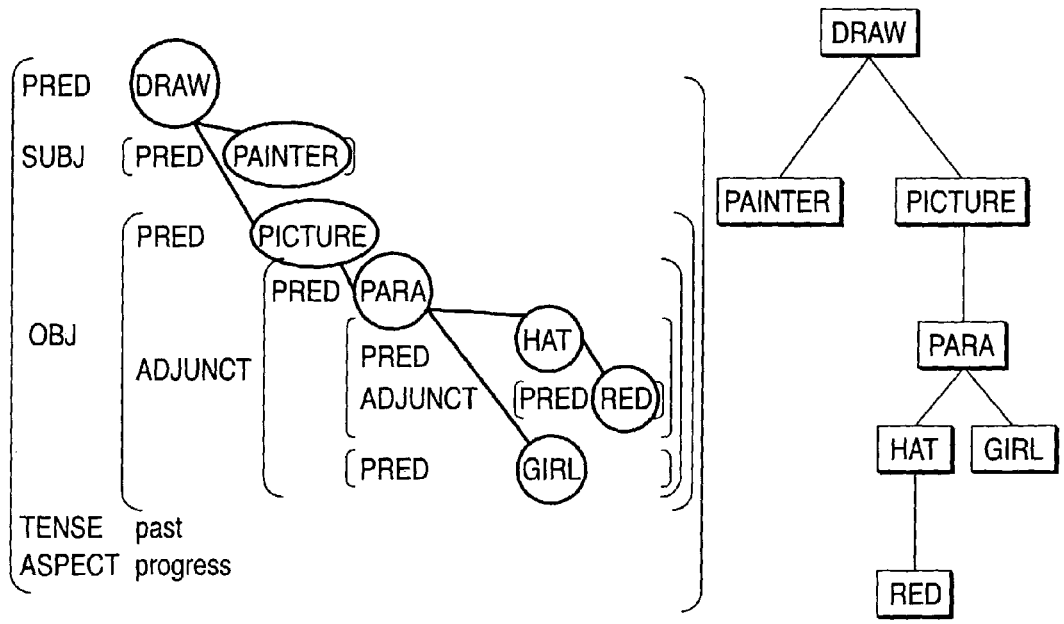
FIG. 9 is a drawing to describe conversion processing from f-structure to tree structure.

FIG. 9 illustrates the tree structure obtained as step 2 is executed. PARA in the figure denotes a symbol representing a parallel structure; it is the sole exception that the value of PRED does not become a word.

Figure 10:
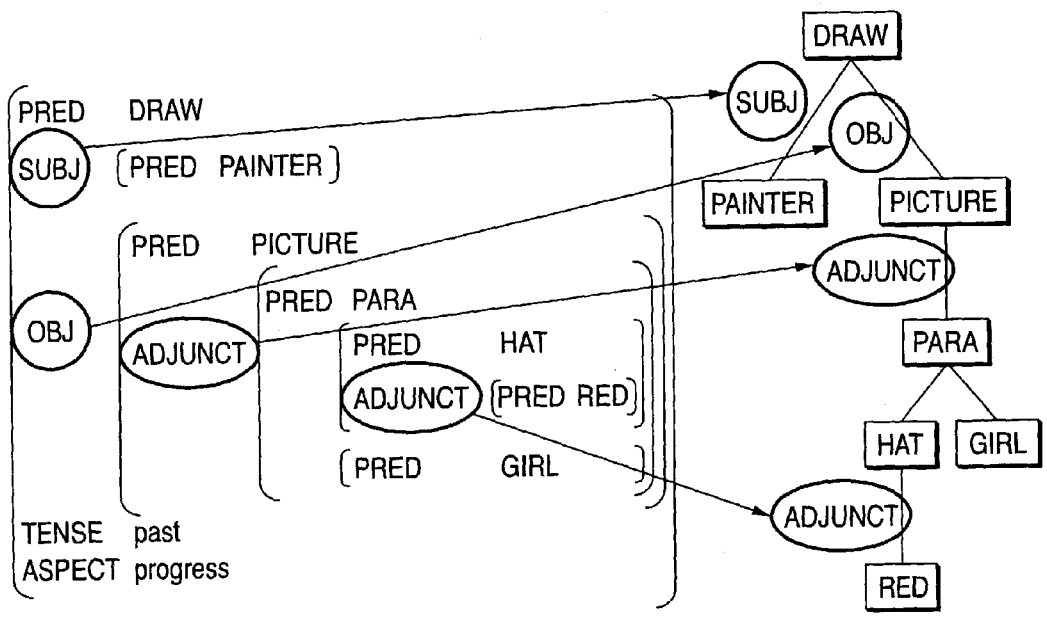
FIG. 10 is a drawing to describe conversion processing from f-structure to tree structure.

[Step 3]
Processing concerning n1 "wherein link connecting n1 and n2 is given an attribute paired with v2, and if the attribute paired with v2 does not exist, nothing is given thereto" is performed for all nodes obtained at [step 1]. However, processing is not performed for the node corresponding to the root of the tree structure. FIG. 10 illustrates the processing result of step 3 concerning example sentence (5).

Figure 11:
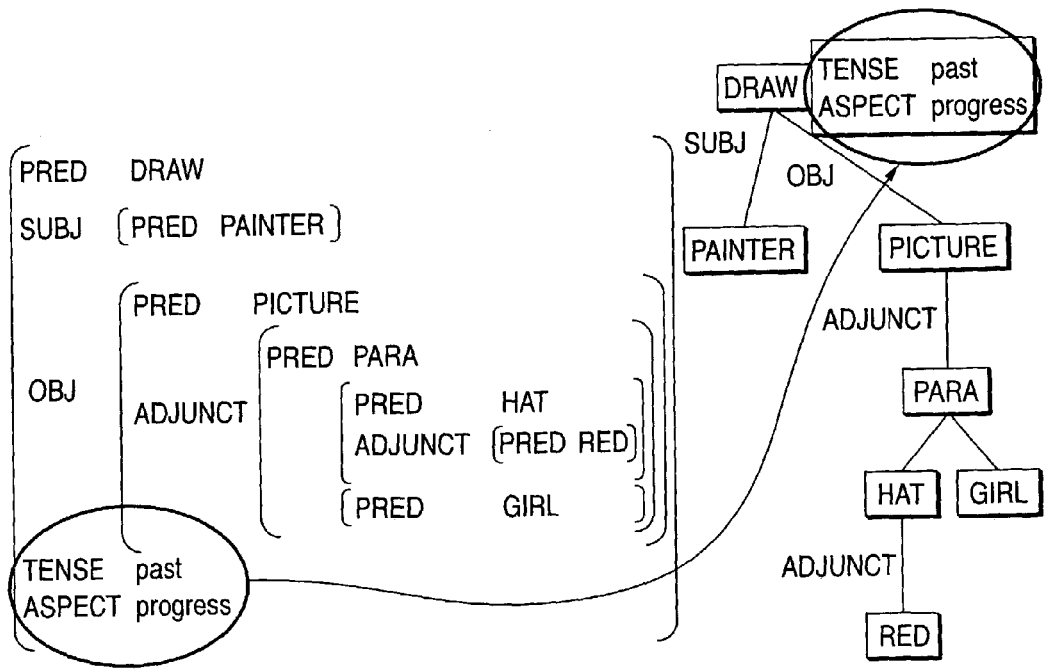
FIG. 11 is a drawing to describe conversion processing from f-structure to tree structure.

[Step 4]
Processing concerning n1 "wherein if there is an value having no PRED in value paired with attribute existing in v2 for n1, the attribute and the value paired with the attribute are given as attribute information of n1" is performed for all nodes obtained at [step 1]. FIG. 11 illustrates the processing result of step 4 concerning example sentence (5).

The illustration dictionary retention section 14 retains a set of English words and illustrations corresponding to the words (illustration dictionary).

Figure 12:
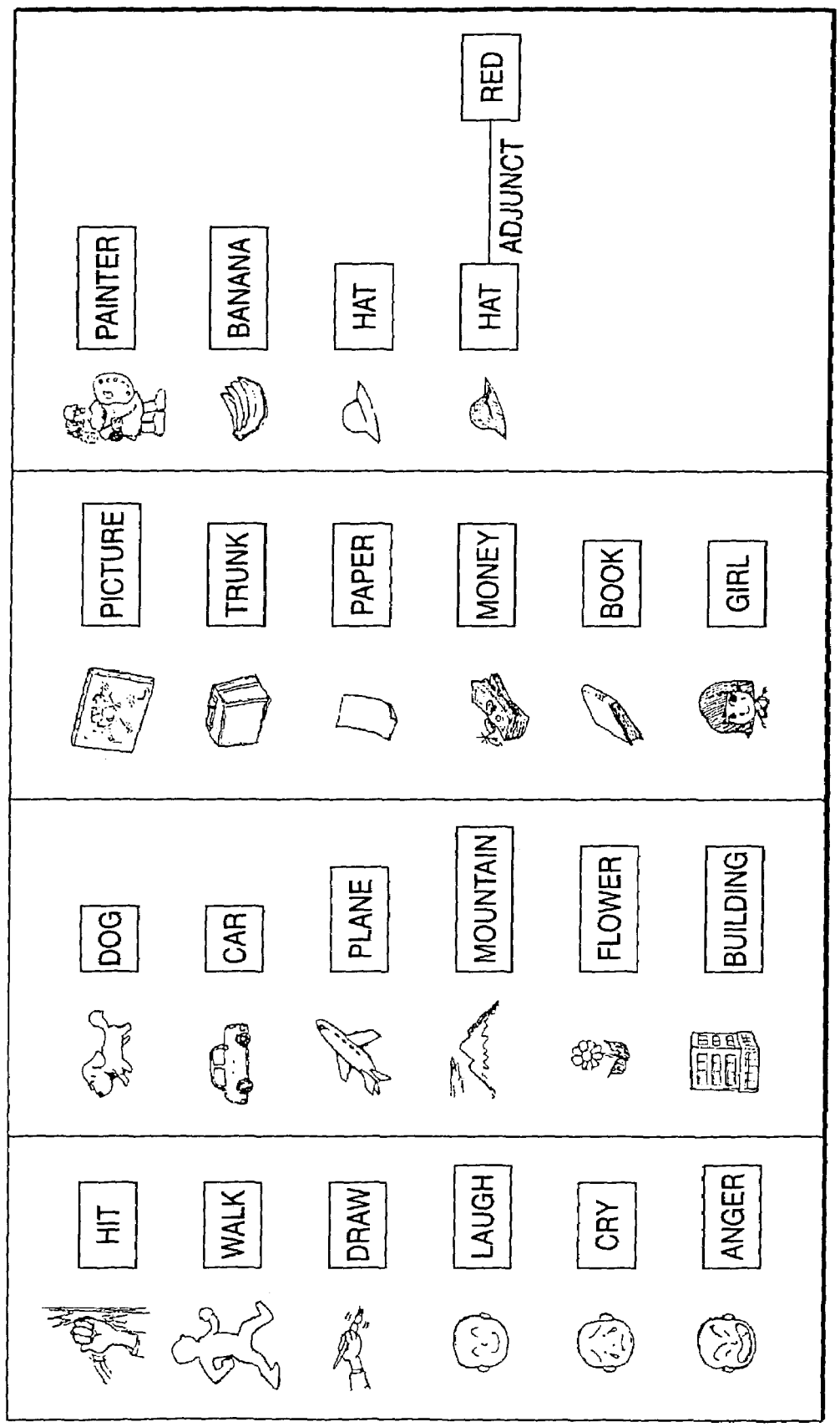
FIG. 12 is a drawing to show an example of an illustration dictionary.

FIG. 12 shows an example of the illustration dictionary. As shown in the figure, one illustration may correspond to one word or may correspond to a plurality of words connected by a link given an attribute. In the latter case, for example, if it is difficult to illustrate "a verb" by itself, illustrating the verb including the case of the verb (SUBJ, OBJ, etc.,) is allowed. In the example shown in FIG. 12, one word (word set connected by a link) is related to one illustration, but if a synonym exists, a plurality of words may be related to one illustration.

The attribute dictionary retention section 15 retains a set of pairs each of an attribute or an value occurring in f-structure and the attribute or the value represented in a language, which the second user can understand (attribute dictionary). It should be noted that the PRED attribute and the values corresponding to the PRED attribute are not contained in the attribute dictionary.

FIG. 13 shows an example of the attribute dictionary. In the example shown in the figure, the attributes or the values are represented in English for convenience of explanation; in fact, however, they are represented in a language, which the second user can understand.

The illustration representation presentation section 16 references the illustration dictionary retained in the illustration dictionary retention section 14, thereby replacing a word (or a plurality of words connected by a link) in the nodes of the tree structure obtained from the tree structure conversion section 13 with an illustration. Further, the illustration representation presentation section 16 references the attribute dictionary retained in the attribute dictionary retention section 15, thereby replacing the attribute-value pairs given to the tree structure with language representation that can be understood by the second user. The illustration representation presentation section 16 presents the obtained representation to the second user, but does not present any attribute or value not registered in the attribute dictionary.

Figure 14:
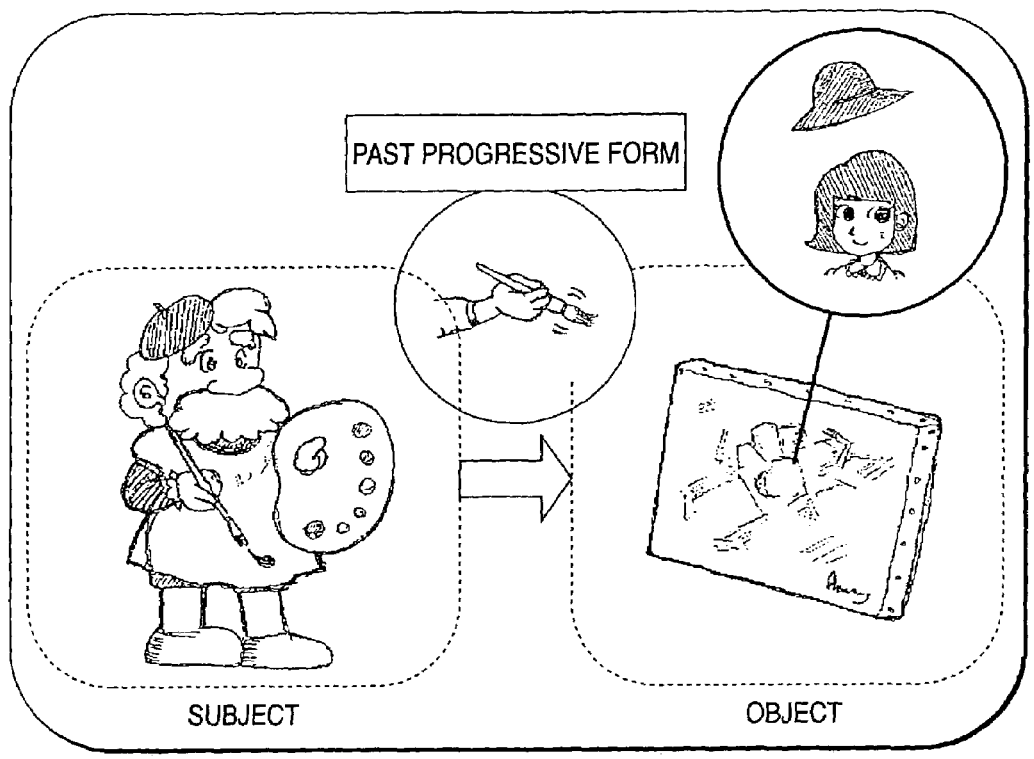
FIG. 14 is a drawing to show a display example of illustration representation presentation section.

FIG. 14 shows a presentation example of the representation replacing the tree structure shown in FIG. 11 using the illustration dictionary shown in FIG. 12 and the attribute dictionary shown in FIG. 13. As described above, the node corresponding to PARA is a symbol representing a parallel structure and thus is represented in the format in which the node corresponding to PARA contains (a plurality of) child nodes of PARA. The child node n1 linked with the relation of SUBJ and the child node n2 linked with the relation of OBJ from the same parent node are presented as an arrow is drawn from n1 to n2. Further, the parent-child relationship between the parent node and the child nodes liked with the relations of SUBJ, OBJ, SOURCE, GOAL, LOC, TIME, and INSTR from the parent node is represented by placing the illustrations corresponding to the child nodes so as to touch the illustration of the parent node rather than represented by explicitly drawing lines. For the child node having the relation of ADJUNCT with the parent node, child node is given in the form of a balloon from the illustration of the parent node.

According to the described configuration, the English sentence input to the analysis-target sentence acquisition section 11 can be converted into the format, which the second user can understand. In the embodiment, except that the attribute dictionary depends on the language (language, which the second user can understand), other sections need not be changed regardless of what language the second user understands.

It is sufficient to register attributes or attribute names (about 100 different attributes or attribute names) occurring in f-structure in the attribute dictionary. It is a far easy job to construct an attribute dictionary as compared with a case where a machine translation system involving a language, which the second user can understand, as a target language must be constructed with the transfer system or the interlingua system. If the language representation in the attribute dictionary (see FIG. 13) is also made illustration representation, the communication support system can be made a completely language-independent system.

Second Embodiment

Figure 15:
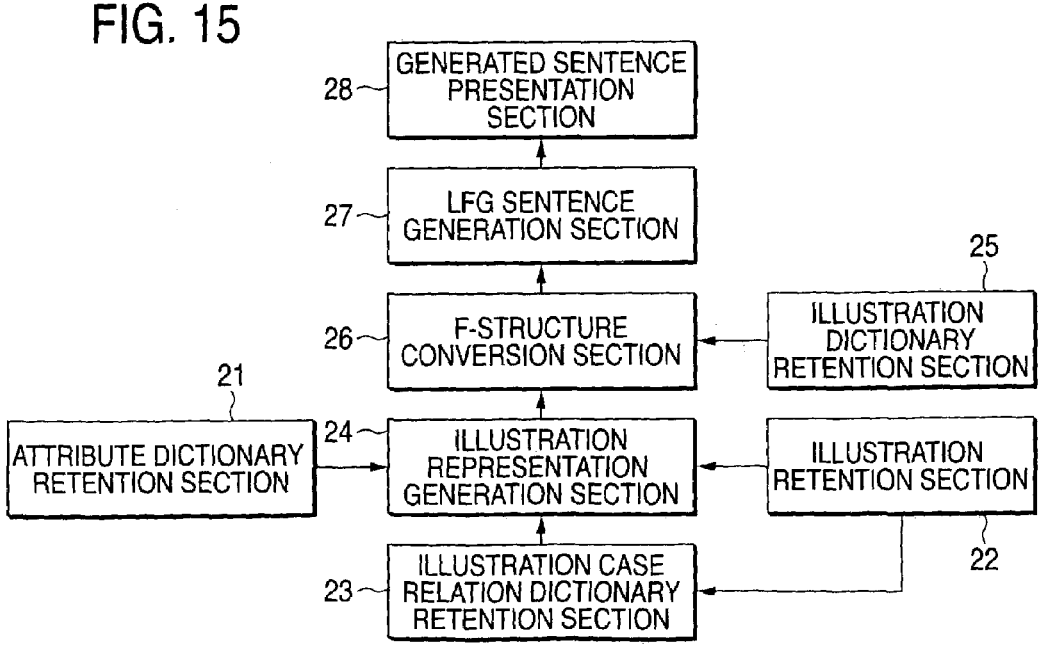
FIG. 15 is a block diagram to show the functional configuration of a multilanguage communication support system according to a second embodiment of the invention.

FIG. 15 schematically shows the configuration of a multilanguage communication support system according to a second embodiment of the invention.

In the embodiment shown in the figure, semantic analysis section based on LFG (Lexical Functional Grammar) is used. LFG outputs a language-independent structure called f-structure. However, semantic analysis section capable of providing the analysis result having parallelism across languages would be able to provide a similar advantage even if it is based on any other than LFG as with the first embodiment.

The multilanguage communication support system according to the second embodiment makes it possible to create illustration representation corresponding to the contents to be reported to a second user using a different language from the language used by a first user by equal operation regardless of what language the first user understands. Further, if the second user can understand English, illustration representation can be converted into an English sentence for smooth communication. An example of the system for converting illustration representation into an English sentence will be discussed, but similar advantages can be provided if any language other than English is to be processed.

As shown in FIG. 15, the multilanguage communication support system according to the embodiment includes an attribute dictionary retention section 21, an illustration retention section 22, an illustration case relation dictionary retention section 23, an illustration representation generation section 24, an illustration dictionary retention section 25, a f-structure conversion section 26, an LFG sentence generation section 27, and a generated sentence presentation section 28.

The attribute dictionary retention section 21 is implemented as almost the same configuration as the attribute dictionary retention section 15 according to the first embodiment; they differ in that which attribute can be paired with each value is defined. FIG. 16 shows an example of an attribute dictionary.

Figure 17:
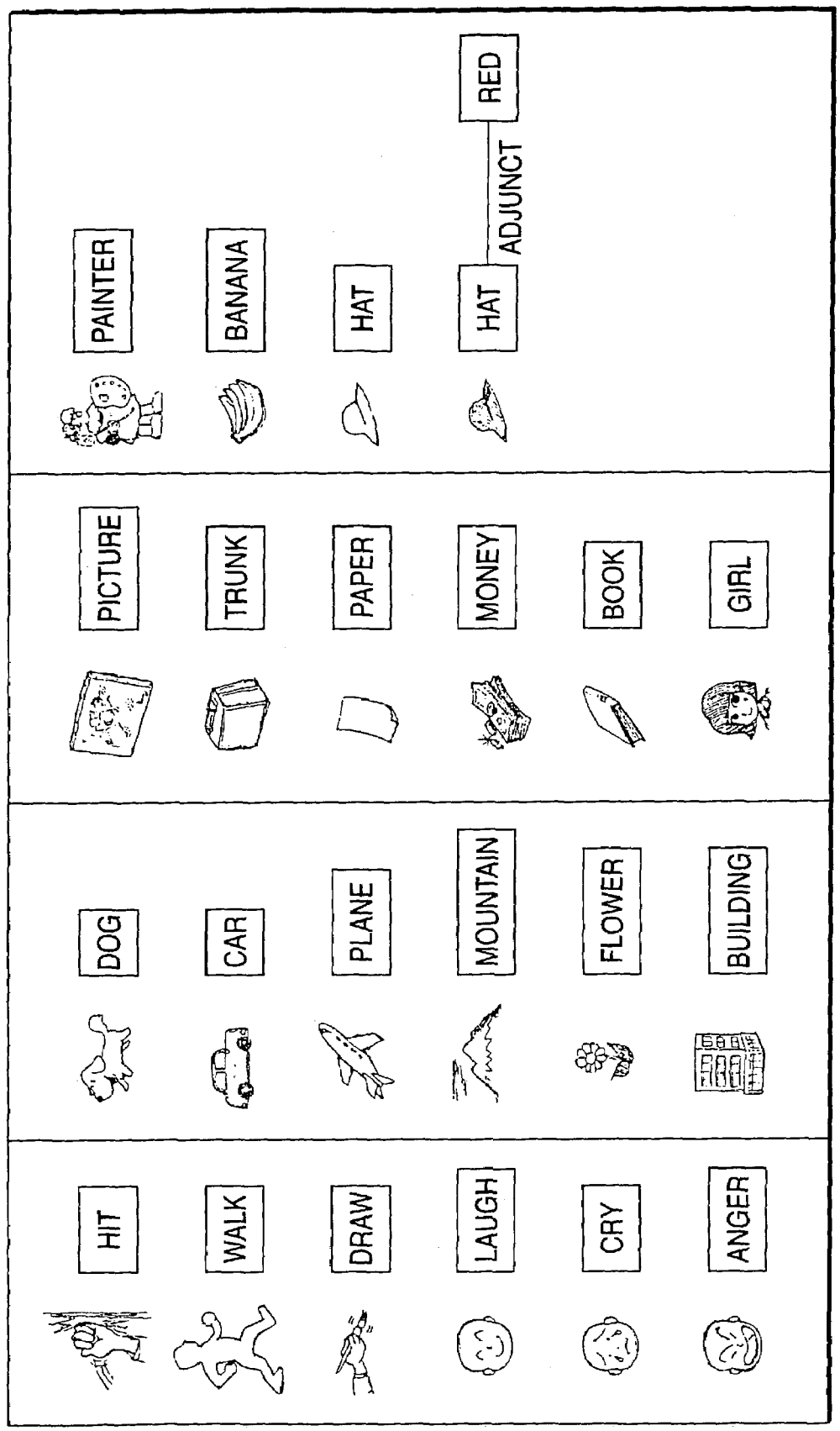
FIG. 17 is a drawing to show an example of an illustration set retained by illustration retention section.

The illustration retention section 22 retains a set of illustrations. In each illustration, "ID number" and "information indicating whether or not the illustration represents a verb (verb illustration)" are described. FIG. 17 shows an example of the illustration set retained by the illustration retention section 22.

The illustration case relation dictionary retention section 23 retains an illustration case relation dictionary describing what case relation each of the verb illustrations retained in the illustration retention section 22 can have. For example, the illustration corresponding to verb "give" can have three case relations of SUBJ(ect), OBJ(ect), and GOAL (see FIG. 4). In the embodiment, the case relations, which a verb has, are assumed to be any of six case relations of SUBJ, OBJ, SOURCE, GOAL, LOC, TIME, and INSTR. Further, the illustration case relation dictionary describes which of the illustrations retained in the illustration retention section 22 easily becomes a target of a case relation for each case relation. That is, the illustrations are placed in order as they easily become targets for each case relation. In the illustration case relation dictionary, each illustration is identified using the ID number described in the illustration retention section 22 rather than the illustration itself. FIG. 18 shows an example of the illustration case relation dictionary.

The illustration representation generation section 24 has an interface for supporting the first user who creates representation equivalent to illustration representation presented by the illustration representation presentation section 16 in the first embodiment (see FIG. 14). The procedure to support illustration representation generation will be discussed below in detail:

[Step 1]

Figure 19:
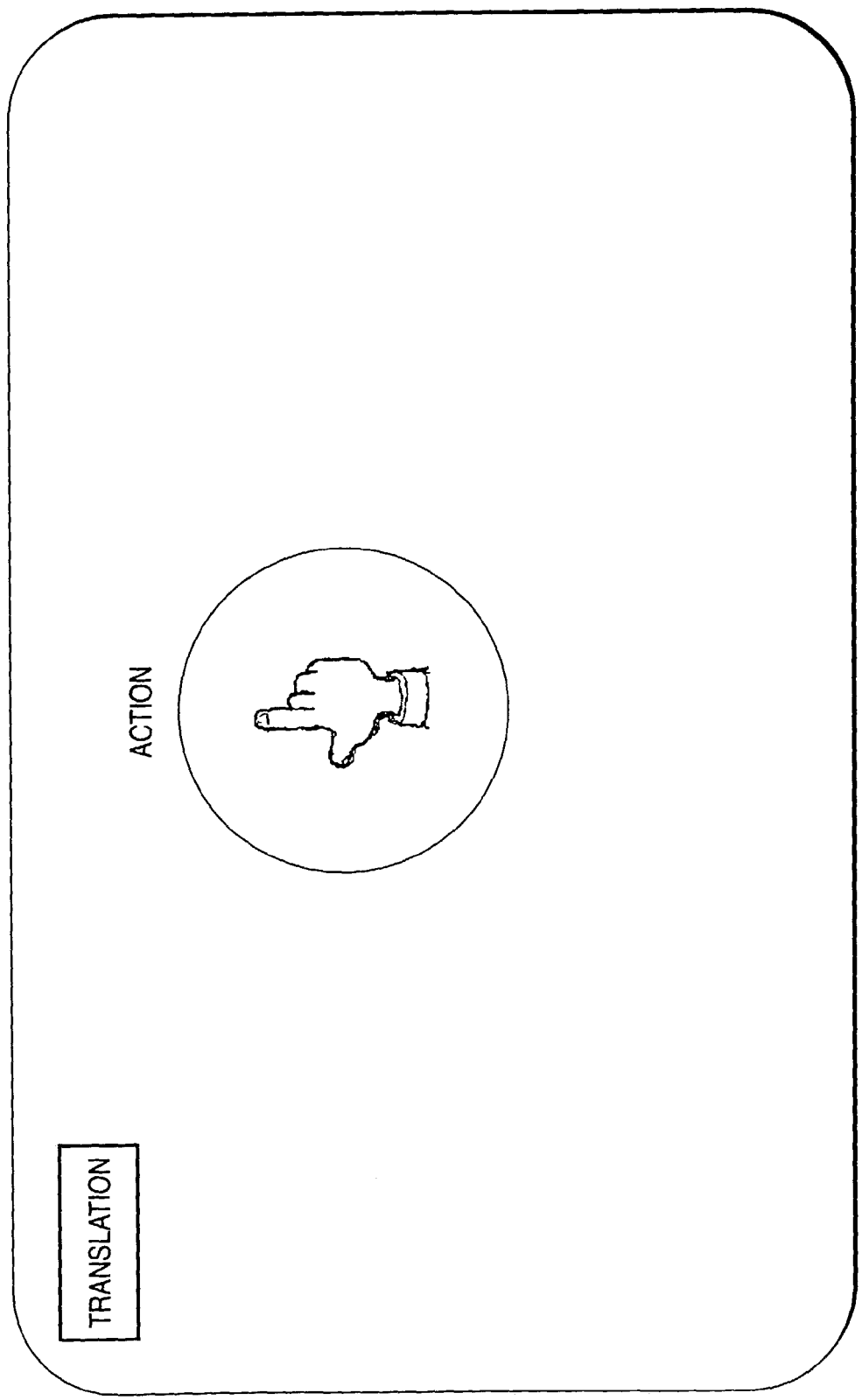
FIG. 19 is a drawing to show a display example for illustration representation generation section to support generating a tree structure.
Figure 20:
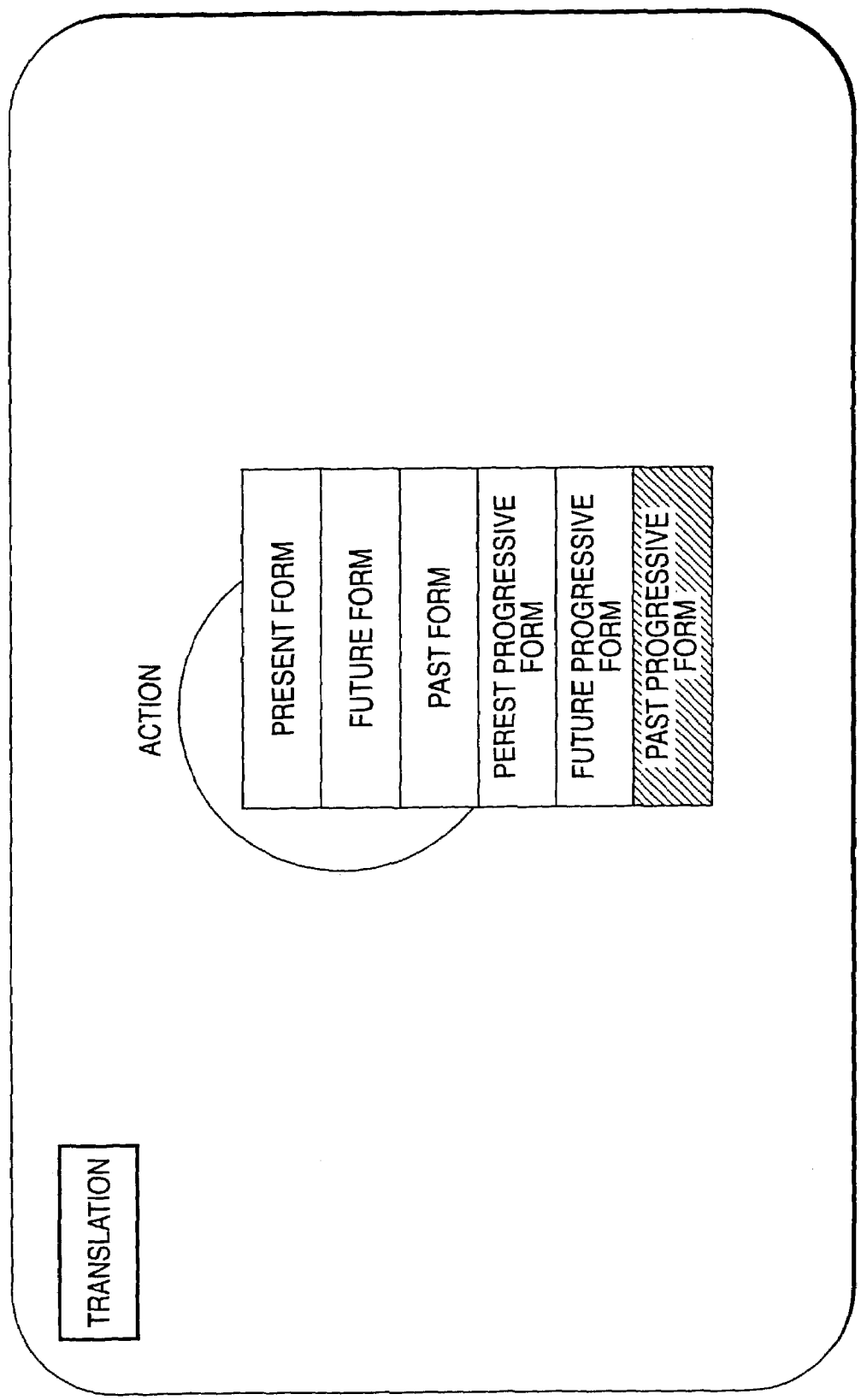
FIG. 20 is a drawing to show a display example for the illustration representation generation section to support generating the tree structure.

The illustration representation generation section 24 refers the attribute dictionary retained in the attribute dictionary retention section 21 to request the first user to specify the values corresponding to TENSE and ASPECT of "verb as a center of the sentence to be reported to the second user by the first user". FIGS. 19 and 20 show how the first user is requested to specify the values corresponding to TENSE and ASPECT of the verb as the center of the sentence to be reported on the interface provided by the illustration representation generation section 24. If necessary, the user maybe requested to specify the value corresponding to any attribute other than TENSE or ASPECT.

[Step 2]

Figure 21:
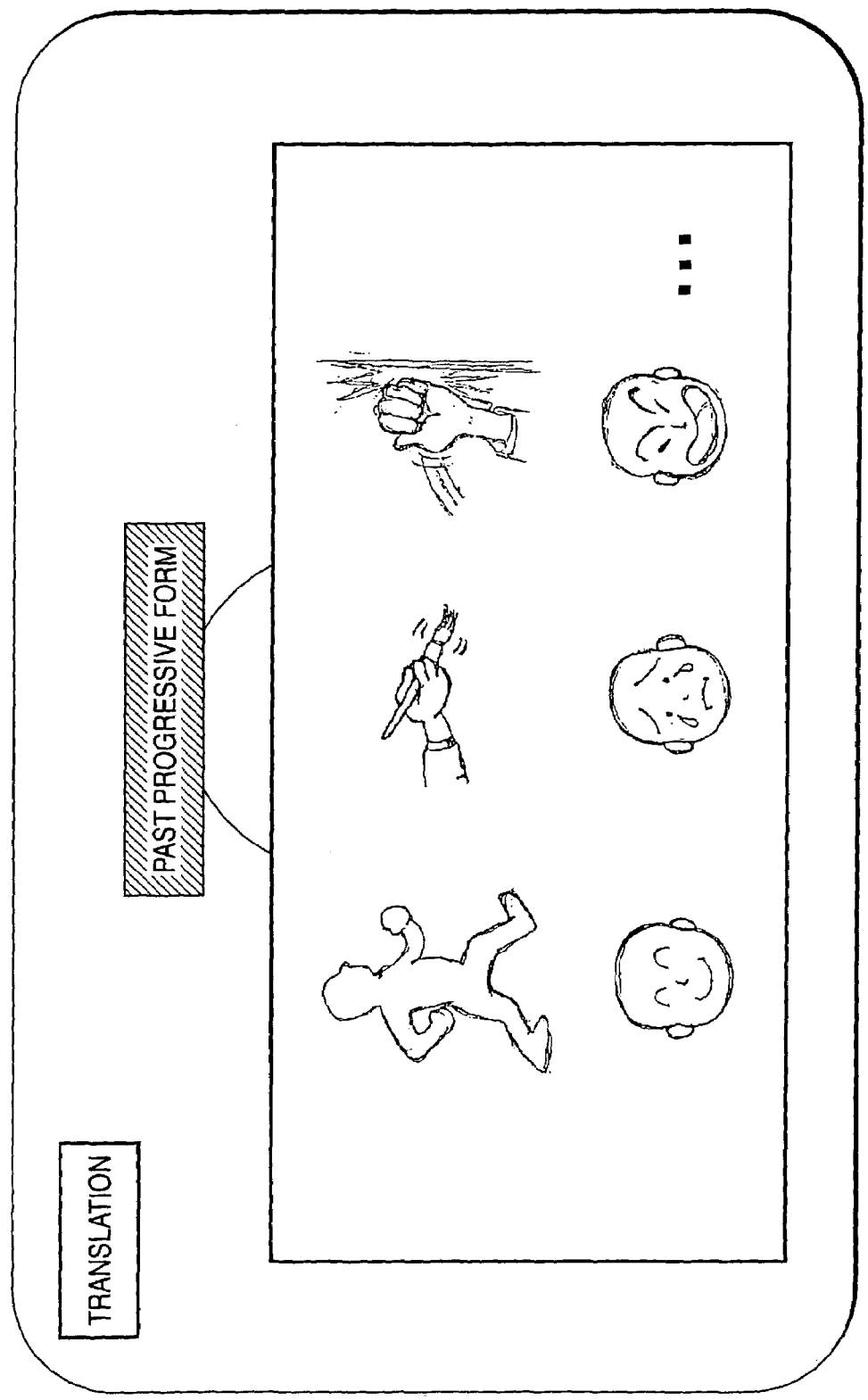
FIG. 21 is a drawing to show a display example for the illustration representation generation section to support generating the tree structure.

The illustration representation generation section 24 references the illustrations retained in the illustration retention section 22 to request the first user to specify "verb as the nucleus of the sentence to be reported to the second user by the first user". FIG. 21 shows how the first user is requested to specify "draw" as the verb as the nucleus of the sentence to be reported on the interface provided by the illustration representation generation section 24.

[Step 3]

Figure 22:
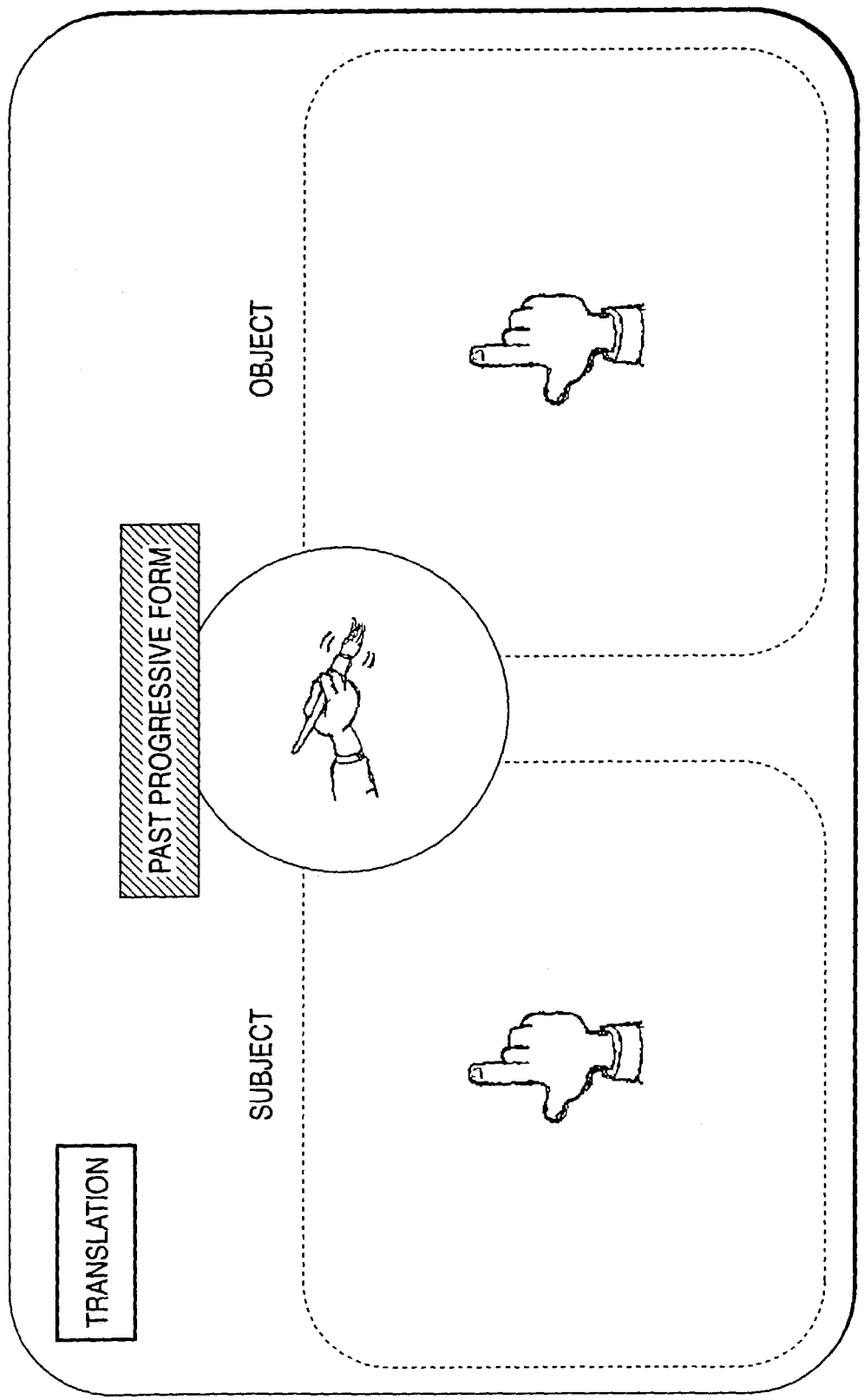
FIG. 22 is a drawing to show a display example for the illustration representation generation section to support generating the tree structure.
Figure 23:
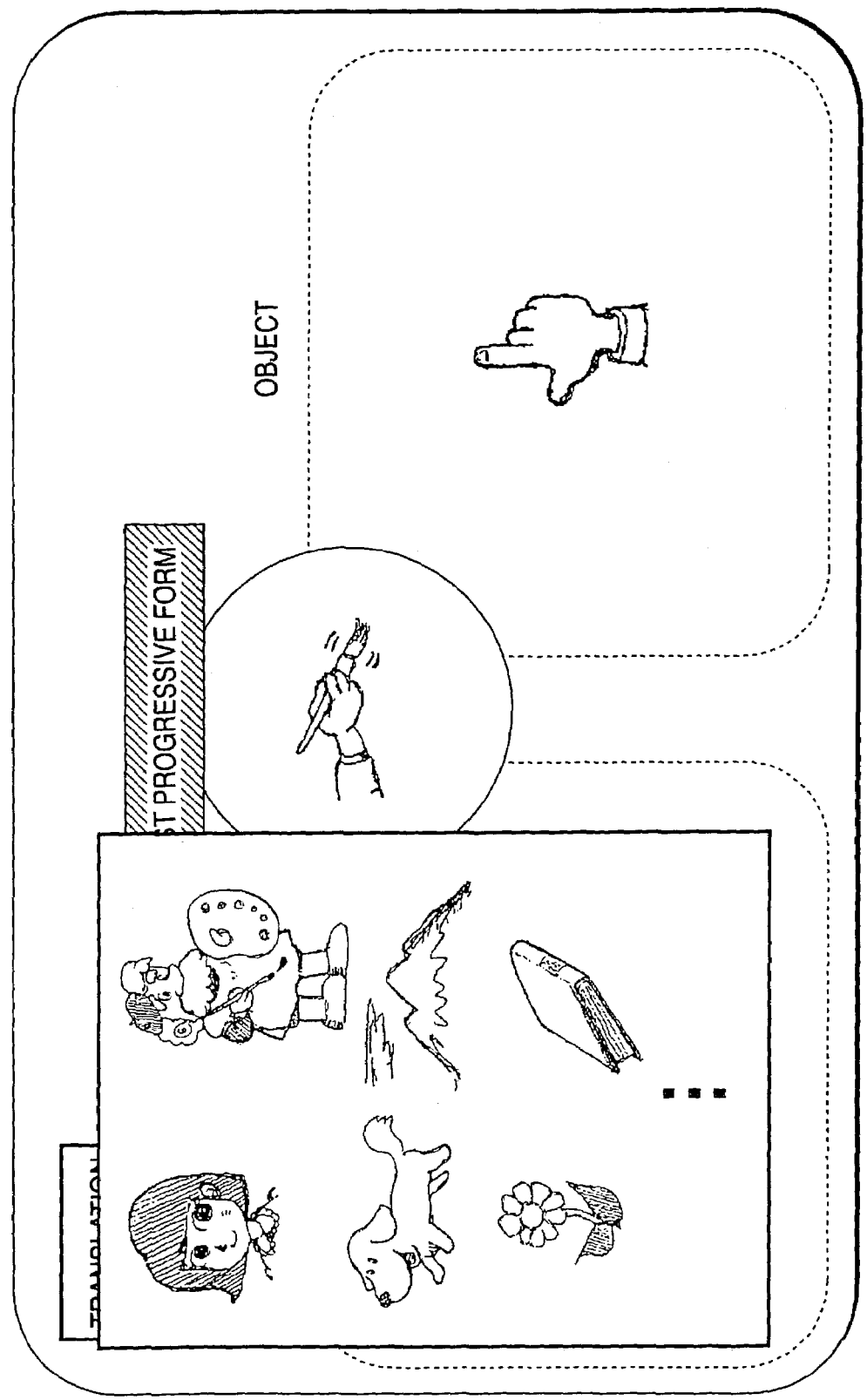
FIG. 23 is a drawing to show a display example for the illustration representation generation section to support generating the tree structure.
Figure 24:
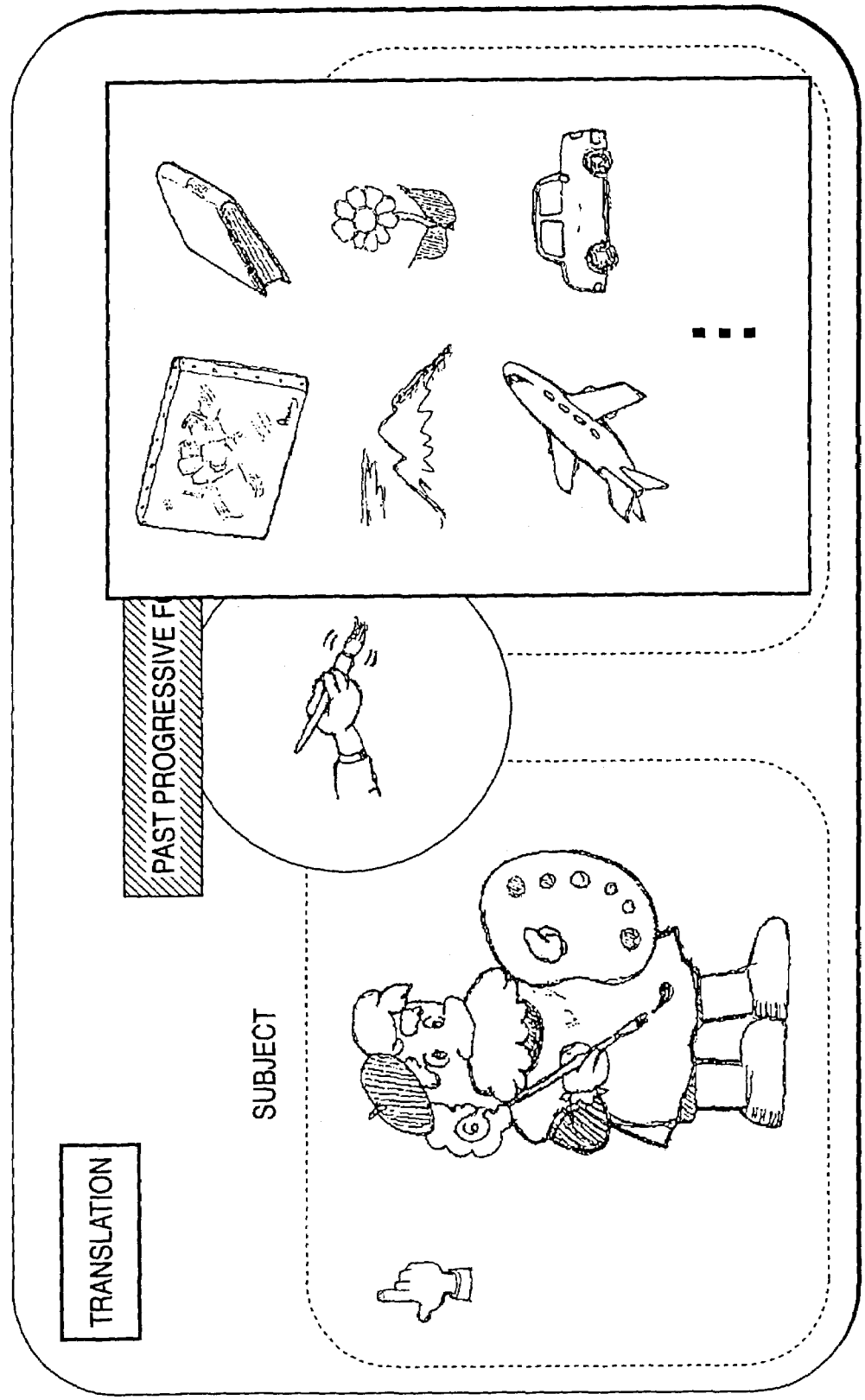
FIG. 24 is a drawing to show a display example for the illustration representation generation section to support generating the tree structure.

The illustration representation generation section 24 refers the illustration case relation dictionary retained in the illustration case relation dictionary retention section 23 to display the case relation of "the illustration corresponding to the verb" specified at [step 2] and to present illustration candidates to the user. Thereby, the illustration representation generation section 24 requests the first user to specify the illustration corresponding to "case relation target elements". The illustration candidates are presented according to the priority order in the illustration case relation dictionary. FIGS. 22 to 24 show how the user is requested to specify illustrations of subject and object as the case relation target elements of the verb "draw", which is the nucleus of the sentence to be reported.

[Step 4]

Figure 25:
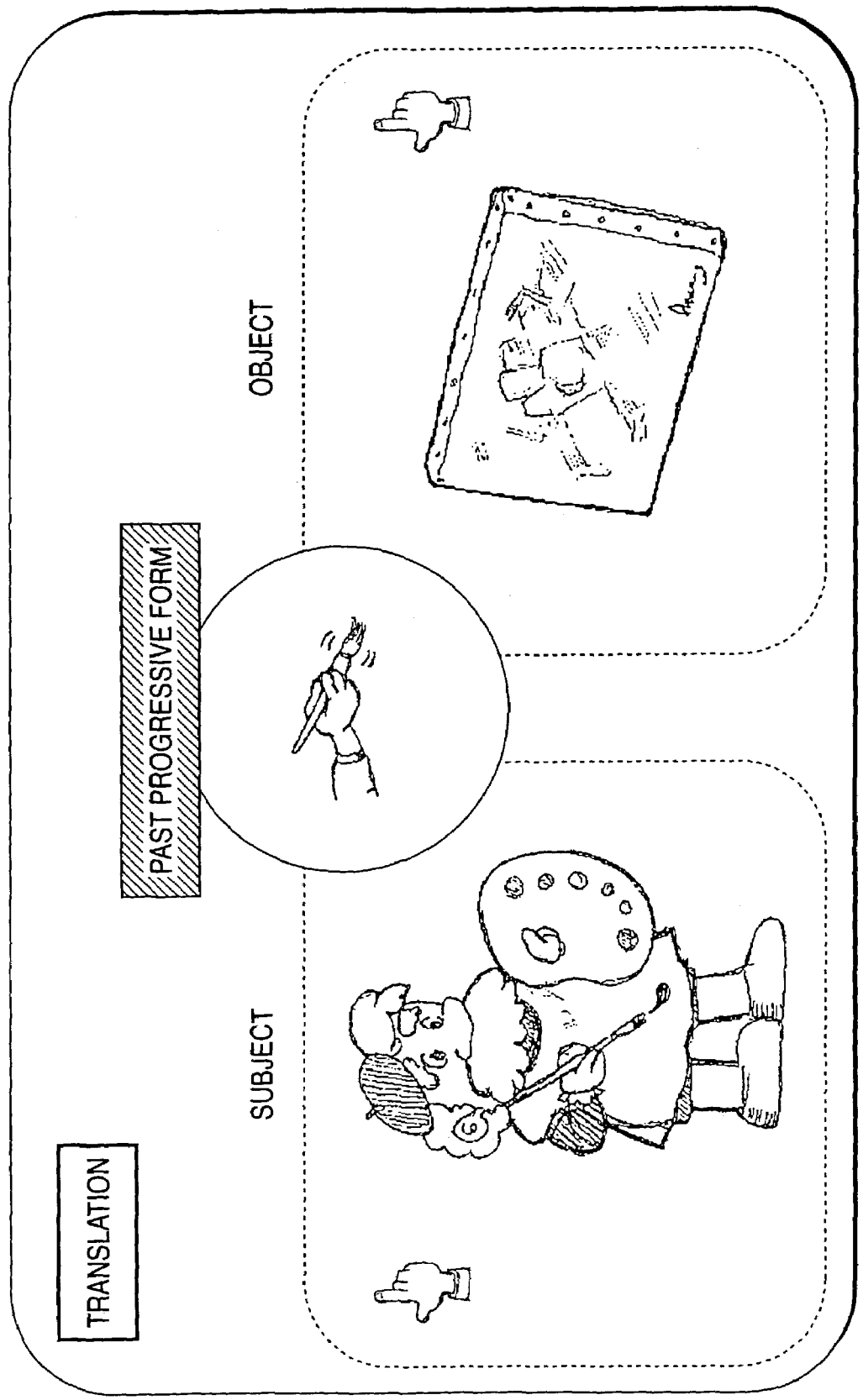
FIG. 25 is a drawing to show a display example for the illustration representation generation section to support generating the tree structure.
Figure 26:
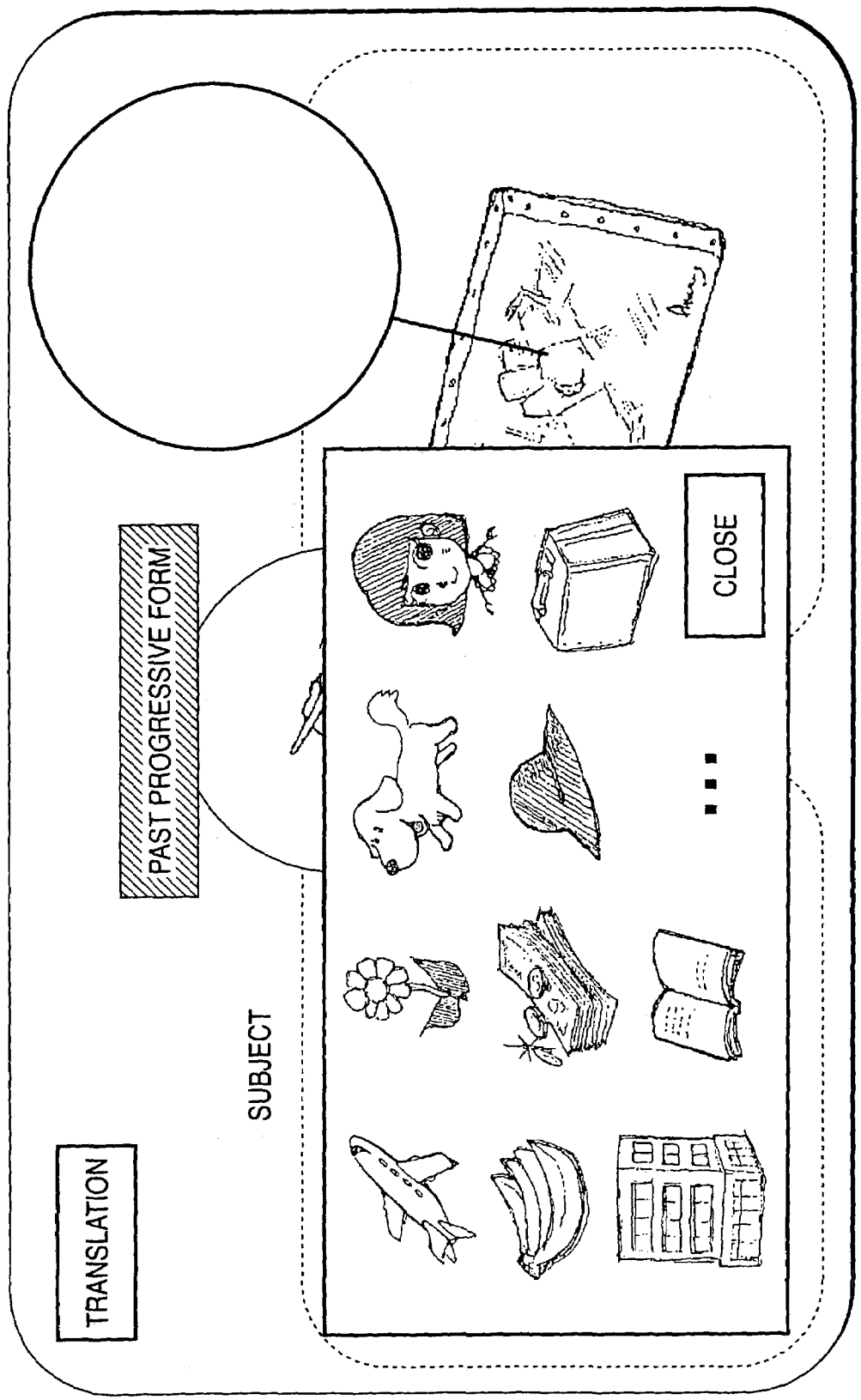
FIG. 26 is a drawing to show a display example for the illustration representation generation section to support generating the tree structure.
Figure 27:
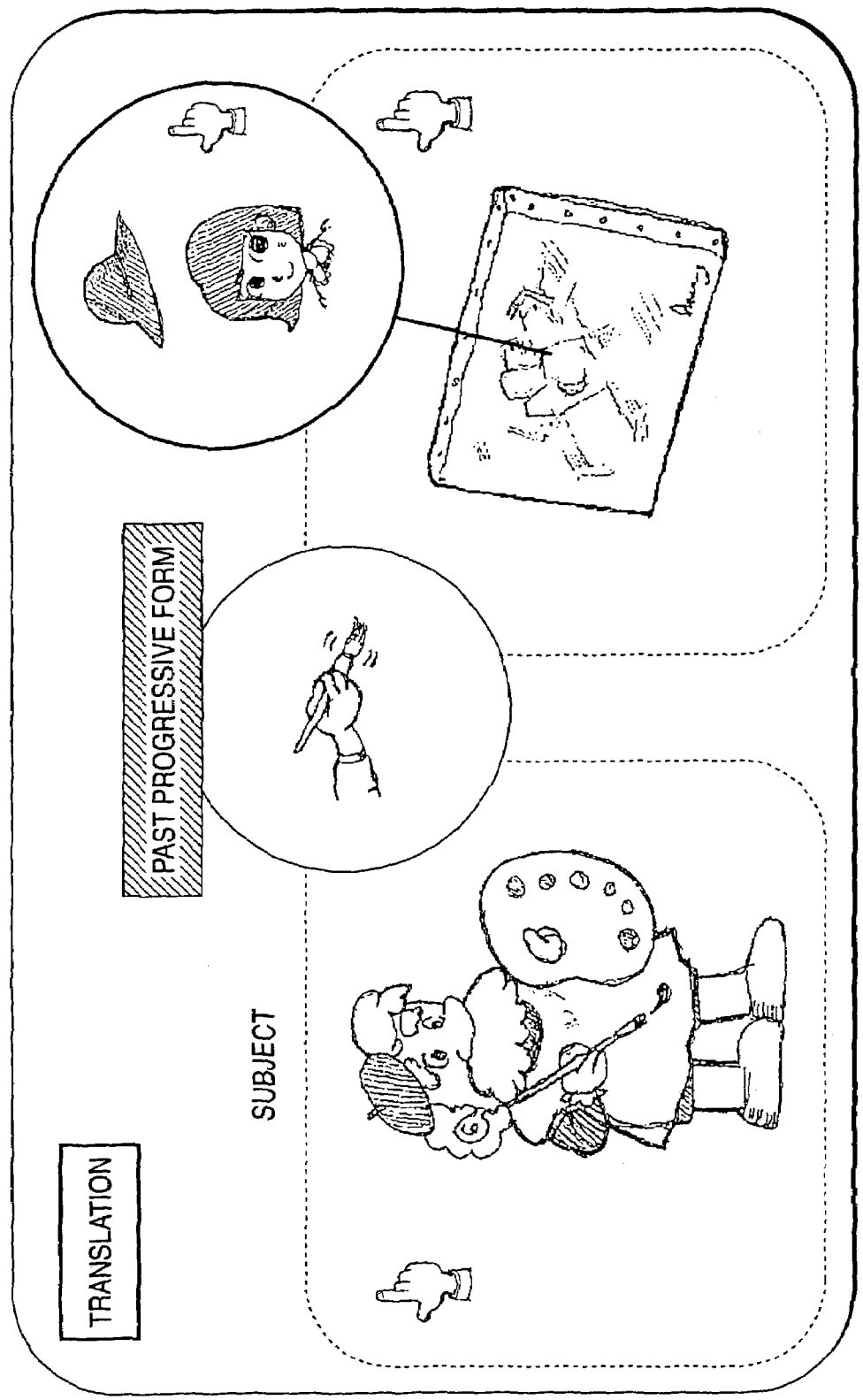
FIG. 27 is a drawing to show a display example for the illustration representation generation section to support generating the tree structure.

Processing of "requesting the first user to specify illustration representation corresponding to 'case relation (modification phrase) target element' as with [step 3] for each illustration specified at [step 3]" is repeated until the first user can represent the contents to be reported. Thereby, the illustration representation is completed. FIGS. 25 to 27 show how the processing of requesting the first user to specify illustration representation is repeated until the first user can represent the contents to be reported on the interface provided by the illustration representation generation section 24.

How the first user generates the illustration representation having the semantic contents corresponding to example sentence (5) on the interface provided by the illustration representation generation section 24 has been described with reference to FIGS. 19 to 27. The illustration representation generation section 24 supports generating a tree structure through the job of illustration representation.

The illustration dictionary retention section 25 is implemented as a similar configuration to that of the illustration dictionary retention section 14 according to the first embodiment. In the first embodiment, the illustration dictionary is used to convert English words (a set of words connected by a link) into illustrations. Whereas, in the second embodiment, the illustration dictionary is used to convert illustrations into English words (a set of words connected by a link).

The f-structure conversion section 26 receives illustration representation obtained from the illustration representation generation section 24 and converts the illustration representation into f-structure. The conversion performed at this point is implemented by reversing the conversion procedure from f-structure to tree structure, performed by the tree structure conversion section 13 in the first embodiment.

LFG sentence generation section 27 receives the f-structure from the f-structure conversion section 26 and converts the f-structure into an English sentence. The conversion procedure from the f-structure to a natural language sentence is described, for example, in paper "LFG generation procedure context-free languages" in collaboration with Kaplan, R. M. and Wedekind, J. (In Proceedings of the 18th International Conference on Computational Linguistics (COLING-2000), Saarbrucken, pp. 425-431 (2000)) and documents cited in the paper, the entire contents of these references being incorporated herein by reference.

Figure 28:
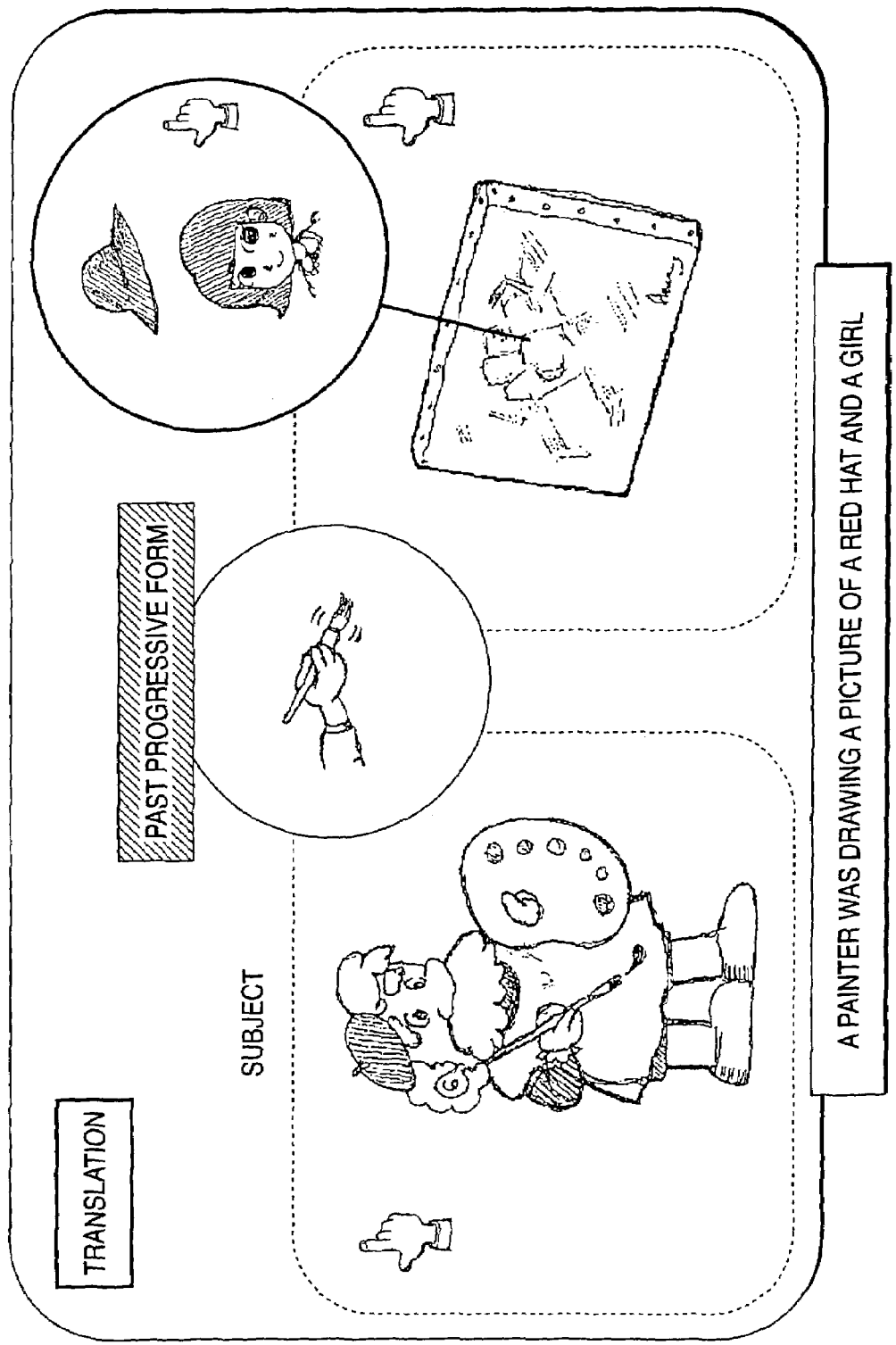
FIG. 28 is a drawing to show a display example of generated sentence presentation section.

The generated sentence presentation section 28 presents the English sentence obtained from LFG sentence generation section 27 to the second user. FIG. 28 shows how the English sentence is presented to the second user.

If only the attribute dictionary retention section 21, the illustration retention section 22, the illustration case relation dictionary retention section 23, and the illustration representation generation section 24 in the system configuration shown in FIG. 15 are used, it is possible to support communication between persons using different languages.

In the above-described sections, the attribute dictionary retained by the attribute dictionary retention section 21 and several words appearing in the user interface (display screen) provided by the illustration representation generation section 24 are language-dependent portions. However, it is a far easy job to construct an attribute dictionary and a user interface for each language to implement the system according to the embodiment as compared with the case where a machine translation system involving a language that can be understood by the first user as a source language must be constructed with the transfer system or the interlingua system.

Further, if the illustration dictionary retention section 25, the f-structure conversion section 26, LFG sentence generation section 27, and the generated sentence presentation section 28 are added, it is made possible to generate an English sentence from illustration representation. When the first and second embodiments of the invention are installed at the same time, it is made possible to convert English into illustration representation and vice versa.

The system based on the embodiments provides useful applications in addition to the communication support system as described above. For example, the configuration of the system can be applied for implementing an English education system. That is, if illustration representation is created, its corresponding English sentence is displayed and therefore it is possible for any person to learn English regardless of which language the person uses.

In the embodiment, the illustration retention section 22 is a section for retaining an illustration set without being structured. However, the illustrations are retained as a thesaurus structure (illustrations representing similar meanings are collected and are classified according to a hierarchical structure) and the illustration representation generation section 24 uses the hierarchical structure to stepwise present illustration candidates for the first user. Thereby, it is also possible to improve the job efficiency in illustration selection as shown in FIGS. 22 to 25, for example.

In the specification, only the relation between two terms of the illustration corresponding to each verb and an illustration easily having the case relation with the verb is described in the illustration case relation dictionary in the illustration case relation dictionary retention section 23. It is expanded to the relation between a verb and a plurality of case relations and when the first user specifies the illustration corresponding to a verb and an illustration having the case relation with the verb, the illustrations which easily become the target of the remaining case relation are presented preferentially, whereby it is also possible to improve the efficiency of illustration selection.

While the invention has been described in detail in its preferred embodiments, it is to be understood that modifications will be apparent to those skilled in the art without departing from the spirit and the scope of the invention. That is, the invention is disclosed for illustrative purposes only and it is to be understood that the invention is not limited to the specific embodiments thereof except as defined in the claims.

As described above in detail, according to the invention, intermediate language representation in the interlingua system is converted from language-based representation into language-independent illustration representation, which can be understood by any persons regardless of what languages they use.

Accordingly, two translation systems of a translation system from one language L into illustration representation and a translation system from illustration representation into language L are simply constructed, whereby communication support among persons using every language can be provided.

That is, the invention makes it possible to solve the problem involved in the existing transfer system and interlingua system requiring that a large number of translation systems be constructed. At the same time, representation that can be understood by any persons using every language are used, so that it is also possible to support communication with persons using a language having a small language population and language learning.

What is claimed is:

1. A communication support system for supporting communication between users using natural languages, the system comprising:

a semantic analysis section for performing semantic analysis processing to a natural language sentence received from a first user to extract a semantic structure that represents word information, case information, and attribute information of the sentence by a nest structure of attribute-value pairs;

a tree structure conversion section for converting the semantic structure into a tree structure by adopting each value of the attribute corresponding to the world information as a node of the tree structure and assuming that the nest structure of attribute-value pairs is a parent-child structure of the tree structure;

an illustration dictionary retention section for retaining word information, case information, and attribute information and illustrations corresponding thereto;

an attribute dictionary retention section for retaining a set of pairs of an attribute or a value appearing in the semantic structure and an attribute or a value represented by a second language or by an illustration; and an illustration representation presentation section for converting words in the nodes of the tree structure obtained by the tree structure conversion section into an illustration by referring to the illustration dictionary retention section, the illustration representation presentation section for converting the attribute-value pairs of the tree structure into the second language or the illustration by referring to the attribute dictionary retention section, the illustration representation presentation section for presenting to a second user an illustration representation of the tree structure converted from the semantic analysis result received from the semantic analysis section.

2. The communication support system according to claim 1, wherein the semantic analysis section performs the analysis processing based on Lexical Functional Grammar to output the word information, the case information, and the attribute information in the format of a functional structure; and wherein the illustration representation presentation section presents to the second user the illustration representation of the tree structure of the functional structure received from the tree structure conversion section by referring to the illustration dictionary retention section.

3. A communication support method for supporting communication between users using natural languages, the method comprising:

performing semantic analysis processing to a natural language sentence received from a first user to extract a semantic structure that represents word information, case information, and attribute information of the sentence by a nest structure of attribute-value pairs;

converting the semantic structure into a tree structure by adopting each value of the attribute corresponding to the word information as a node of the tree structure and assuming that the nest structure of the attribute-value pairs is a parent-child structure of the tree structure;

converting words in the nodes of the tree structure obtained by the converting of the semantic structure, into an illustration by referring to an illustration dictionary that retains (i) attribute information including the word information, the case information and attribute information and (ii) illustrations corresponding thereto;

converting the attribute-value pairs given to the tree structure into a second language or an illustration by referring to an attribute dictionary that retains a set of pairs of an attribute or a value appearing in the semantic structure and an attribute or a value represented by the second language or by the illustration; and presenting to a second user an illustration representation of the tree structure converted from the semantic analysis result.

4. A communication support system for supporting communication between users using natural languages, the system comprising:

an illustration retention section for retaining a set of illustrations;

an illustration case relation dictionary retention section for retaining an illustration case relation dictionary describing what case relation each verb illustration retained in the illustration retention section can have;

an attribute dictionary retention section for retaining a set of pairs of an attribute or an value represented by a second language or an illustration;

an illustration dictionary retention section for retaining word information, case information, and attribute information and illustrations corresponding thereto;

an illustration representation generation section for supporting a first user to select illustrations corresponding to a verb as a center of the sentence to be reported to the second user by the first user from the illustration dictionary retention section, to select a value of an attribute of the verb from the attribute dictionary, to select an illustration corresponding to an element of a case relation from the illustration case relation dictionary so as to generate an illustration representing a sentence, the illustration representation generation section for generating a tree structure representing the semantic structure by adopting each value of the attribute corresponding to the word information as a node of the tree structure and assuming that a nest structure of attribute-value pairs is a parent-child structure of the tree structure;

a semantic structure conversion section for converting the tree structure generated by the illustration representation generation section into the semantic structure represented by a nest structure of attribute-value pairs; and a sentence generation section for generating a natural language sentence from the semantic structure obtained by the semantic structure conversion section and presenting the natural language sentence to a second user.

5. The communication support system according to claim 4, further comprising:

a semantic structure generation section for referencing the illustration dictionary retention section to generate a functional structure from the tree structure received from the illustration representation generation section, wherein the sentence generation section receives the functional structure received from the semantic structure generation section to generate the natural language sentence, and presents the natural language sentence to the second user.

6. A communication support method for supporting communication between users using natural languages, the method comprising:

supporting a first user to select illustrations of a verb as a center of the sentence to be reported to the second user by the first user from an illustration dictionary retaining (i) word information, case information, and attribute information and (2) illustrations corresponding thereto, to select a value of an attribute of the verb from the attribute dictionary, to select an illustration corresponding to an element of a case relation from the illustration case relation dictionary so as to generate an illustration representing a sentence;

generating a tree structure representing the semantic structure by adopting each value of the attribute corresponding to the word information as a node of the tree structure and assuming that a nest structure of attribute-value pairs is a parent-child structure of the tree structure;

converting the generated tree structure into the semantic structure represented by a nest structure of attribute-value pairs;

generating a natural language sentence from the semantic structure obtained by the semantic structure conversion section; and presenting the natural language sentence to the second user.

7. The communication support system according to claim 4, wherein the illustration dictionary retention section retains the illustration representation indicating the word information as a thesaurus structure; and wherein the illustration representation generation section uses the thesaurus structure to support illustration representation generation.

8. The communication support system according to claim 1, wherein the illustration dictionary retention section retains illustrations including an illustration representing a plurality of words.

9. A computer-readable recording medium that stores a program comprising instructions to execute processing for supporting communication between users using natural languages in a computer system, the instructions comprising:

an instruction that causes the computer system to perform semantic analysis processing to a natural language sentence received from a first user to extract a semantic structure that represents word information, case information, and attribute information of the sentence by a nest structure of attribute-value pairs; and an instruction that causes the computer system to convert a representation of the semantic structure into a tree structure by adopting each value of the attribute corresponding to the word information as a node of the tree structure and assuming that the nest structure of the attribute-value pairs is a parent-child structure of the tree structure;

an instruction that causes the computer system to convert words in the nodes of the tree structure obtained by the converting of the semantic structure, into an illustration by referring to an illustration dictionary that retains (i) attribute information including the word information, the case information and attribute information and (ii) illustrations corresponding thereto;

an instruction that causes the computer system to convert the attribute-value pairs given to the tree structure into a second language or an illustration by referring to an attribute dictionary that retains a set of pairs of an attribute or a value appearing in the semantic structure and an attribute or a value represented by the second language or by the illustration; and an instruction that causes the computer system to present to a second user an illustration representation of the tree structure converted from the semantic analysis result.

10. A computer-readable recording medium that stores a program comprising instructions to execute processing for supporting communication between users using natural languages in a computer system, the instructions comprising:

an instruction that causes the computer system to support a first user to select illustrations of a verb as a center of the sentence to be reported to the second user by the first user from an illustration dictionary retaining (i) word information, case information, and attribute information and (ii) illustrations corresponding thereto, to select a value of an attribute of the verb from the attribute dictionary, to select an illustration corresponding to an element of a case relation from the illustration case relation dictionary so as to generate an illustration representing a sentence;

an instruction that causes the computer system to generate a tree structure representing the semantic structure by adopting each value of the attribute corresponding to the word information as a node of the tree structure and assuming that a nest structure of attribute-value pairs is a parent-child structure of the tree structure;

an instruction that causes the computer system to convet the generated tree structure into the semantic structure represented by a nest structure of attribute-value pairs;

an instruction that causes the computer system to generate a natural language sentence from the semantic structure obtained by the semantic structure conversion section; and an instruction that causes the computer system to present the natural language sentence to the second user.

* * * * *